US009013545B2

(12) United States Patent
Hachiya

(10) Patent No.: US 9,013,545 B2
(45) Date of Patent: Apr. 21, 2015

(54) WIRELESS SIGNAL TRANSMISSION DEVICE, 3D IMAGE GLASSES, AND PROGRAM

(75) Inventor: Masakazu Hachiya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 540 days.

(21) Appl. No.: 13/430,768

(22) Filed: Mar. 27, 2012

(65) Prior Publication Data

US 2012/0314041 A1 Dec. 13, 2012

(30) Foreign Application Priority Data

Jun. 7, 2011 (JP) .................................. 2011-127135

(51) Int. Cl.
H04N 13/00 (2006.01)
H04N 13/02 (2006.01)
H04N 13/04 (2006.01)
G02B 27/22 (2006.01)

(52) U.S. Cl.
CPC ........ H04N 13/0438 (2013.01); G02B 27/2264 (2013.01); H04N 2213/008 (2013.01)

(58) Field of Classification Search
USPC .................... 348/42, 46, 51, 53, 56
See application file for complete search history.

(56) References Cited

U.S. PATENT DOCUMENTS 5,821,989 A * 10/1998 Lazzaro et al. ................. 348/56
8,370,873 B2 * 2/2013 Shintani ........................... 725/39
8,436,894 B2 * 5/2013 Chen ................................ 348/56
8,482,511 B2 * 7/2013 Goris et al. .................... 345/102
8,754,932 B2 * 6/2014 Jung et al. ........................ 348/56
8,854,438 B2 * 10/2014 Choi .................................. 348/53
2002/0118277 A1 * 8/2002 Divelbiss et al. ................ 348/56
2002/0163600 A1 * 11/2002 Divelbiss et al. ............... 349/15
2007/0263003 A1 * 11/2007 Ko et al. ......................... 345/502
2008/0297671 A1 * 12/2008 Cha et al. ......................... 349/15
2009/0091708 A1 * 4/2009 Greene ............................. 353/7
2009/0322861 A1 * 12/2009 Jacobs et al. .................... 348/53
2010/0118128 A1 * 5/2010 Choi ............................... 348/53
2011/0050850 A1 * 3/2011 Yamada .......................... 348/43
2011/0050869 A1 * 3/2011 Gotoh et al. .................... 348/56

FOREIGN PATENT DOCUMENTS

EP 2326097 A2 * 5/2011
JP 08/265863 11/1996
JP 2011-97346 A 5/2011

* cited by examiner

Primary Examiner — Daquan Zhao
(74) Attorney, Agent, or Firm — Birch, Stewart, Kolasch & Birch, LLP

(57) ABSTRACT

A wireless signal transmission device of the present invention includes a wireless signal transmission section for, when an image display device displays a 3D image, (i) a sync signal indicative of timing at which a right-eye image and a left-eye image included in the 3D image are switched and (ii) an optical shutter control signal for controlling optical shutters of 3D image glasses which optical shutters alternately transmit and shut the right-eye image and the left-eye image, and for, when the image display device displays an image other than a 3D image, periodically transmitting a certain signal which does not include at least optical shutter control data.

15 Claims, 18 Drawing Sheets

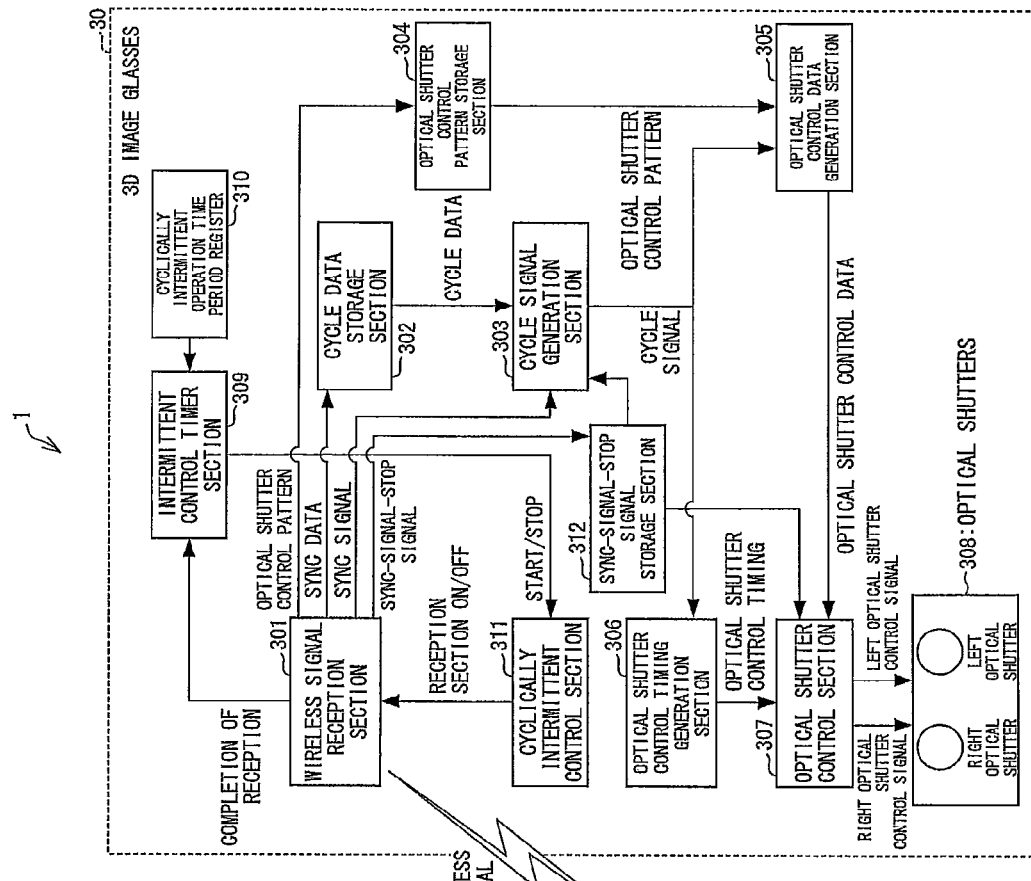
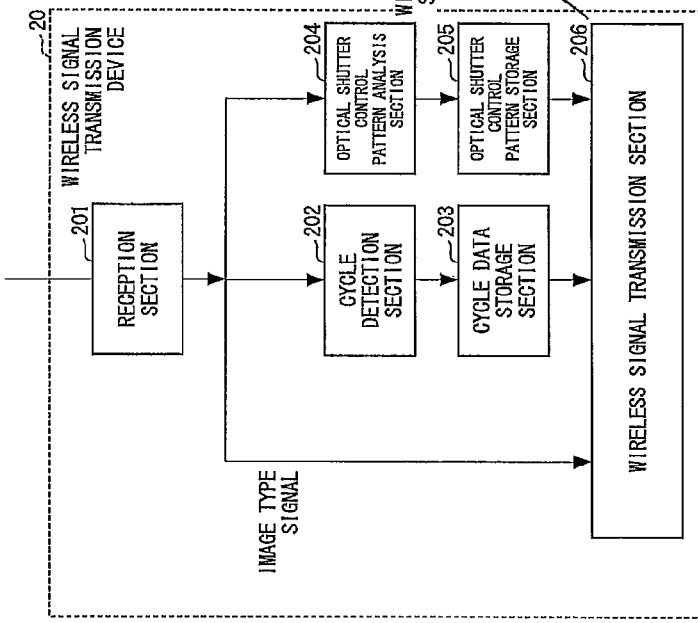
FIG. 1

F I G. 4
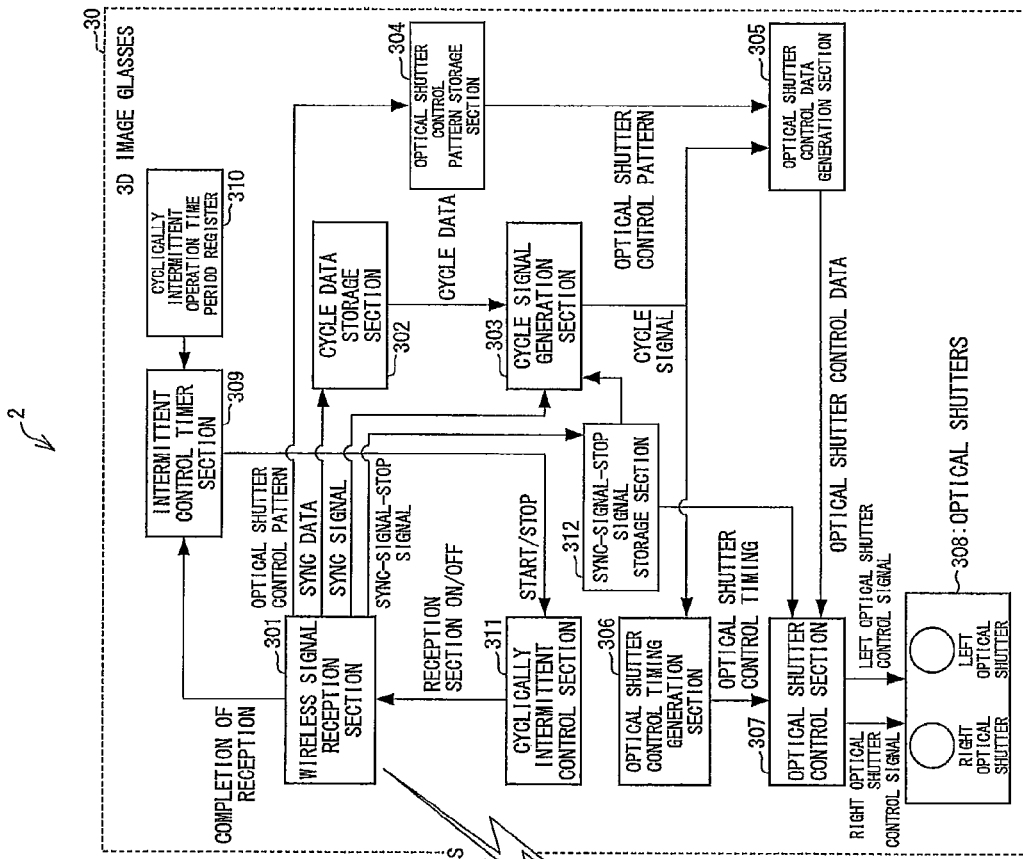
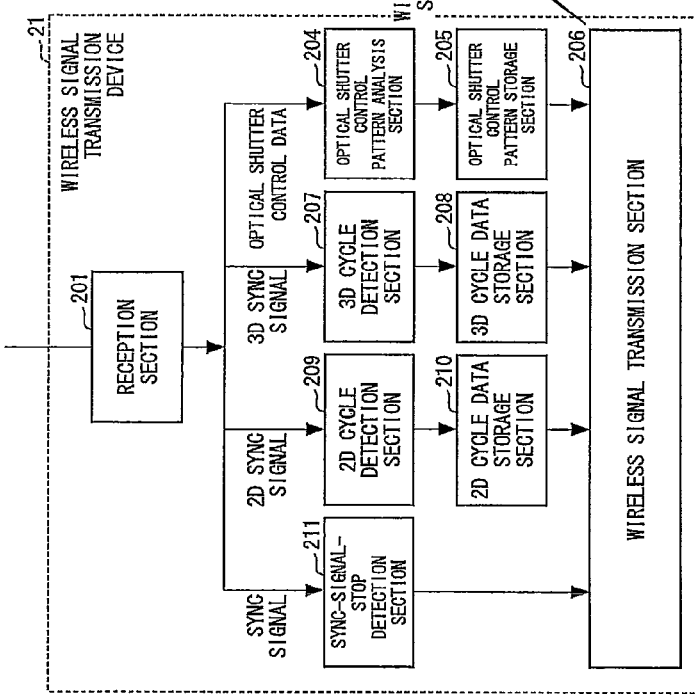

FIG. 6
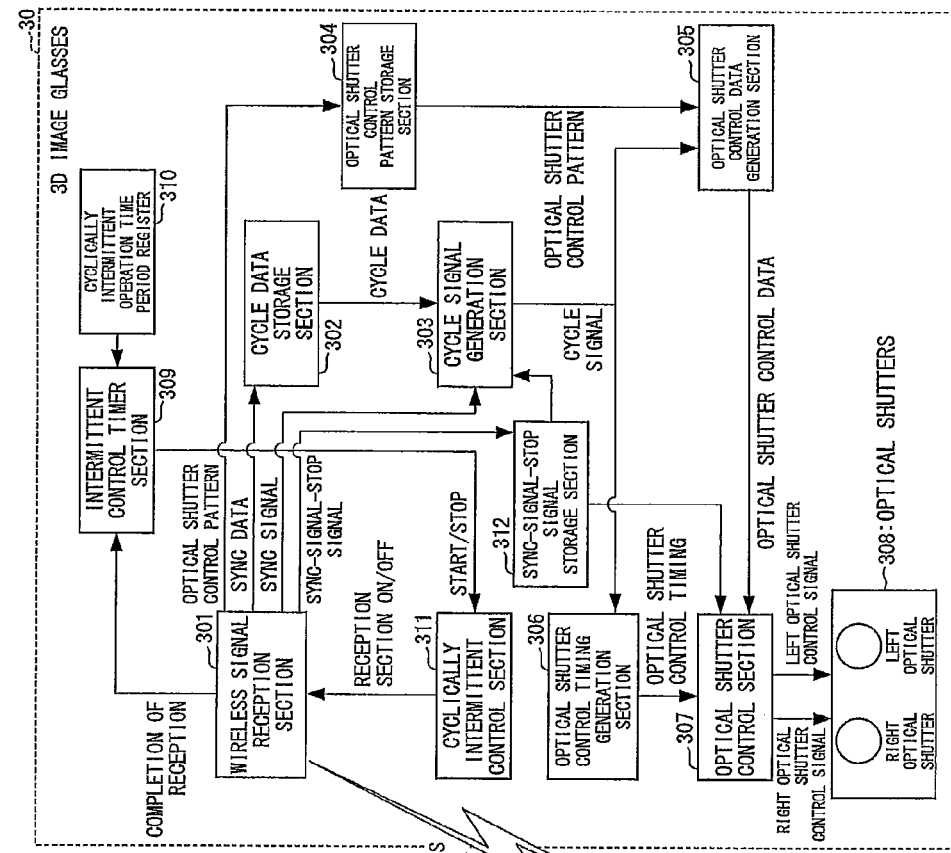
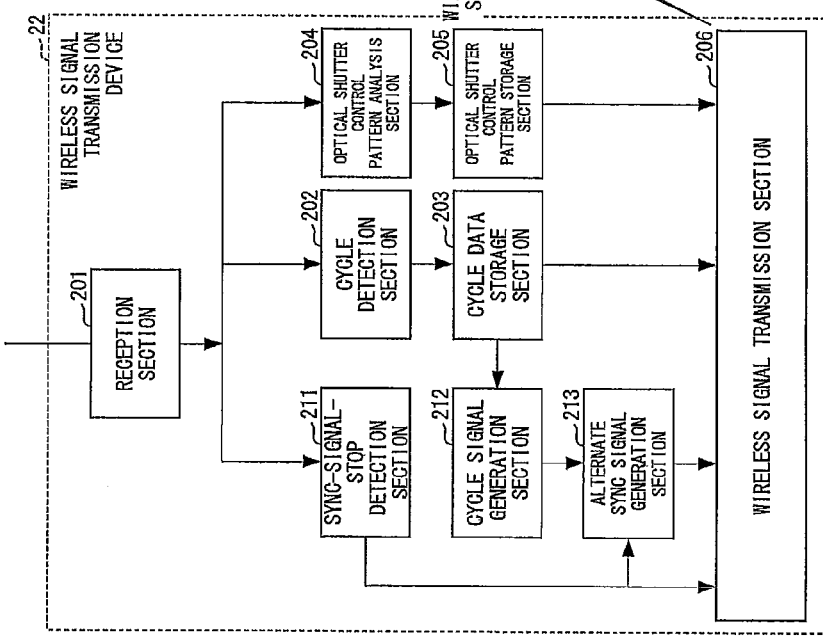

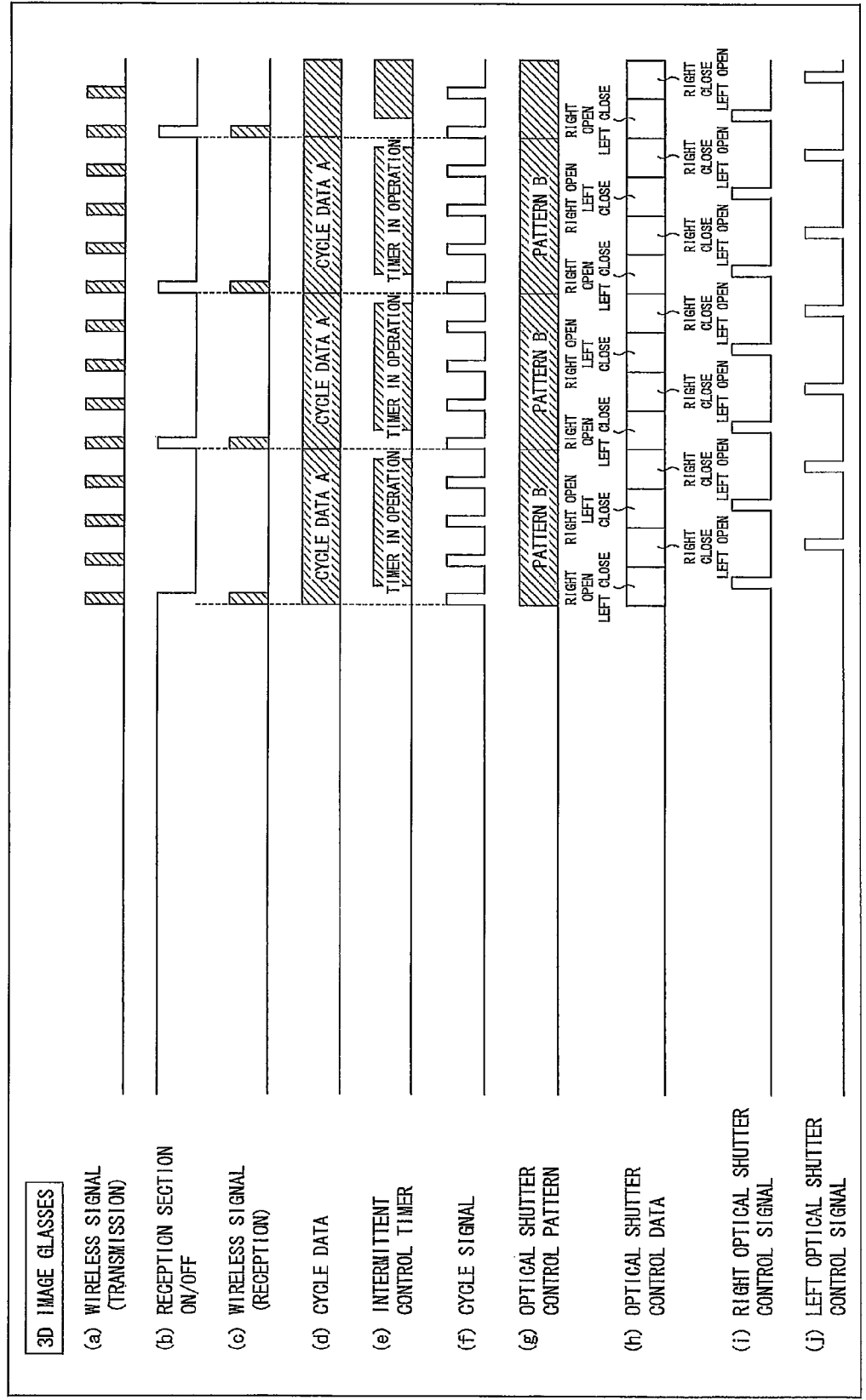

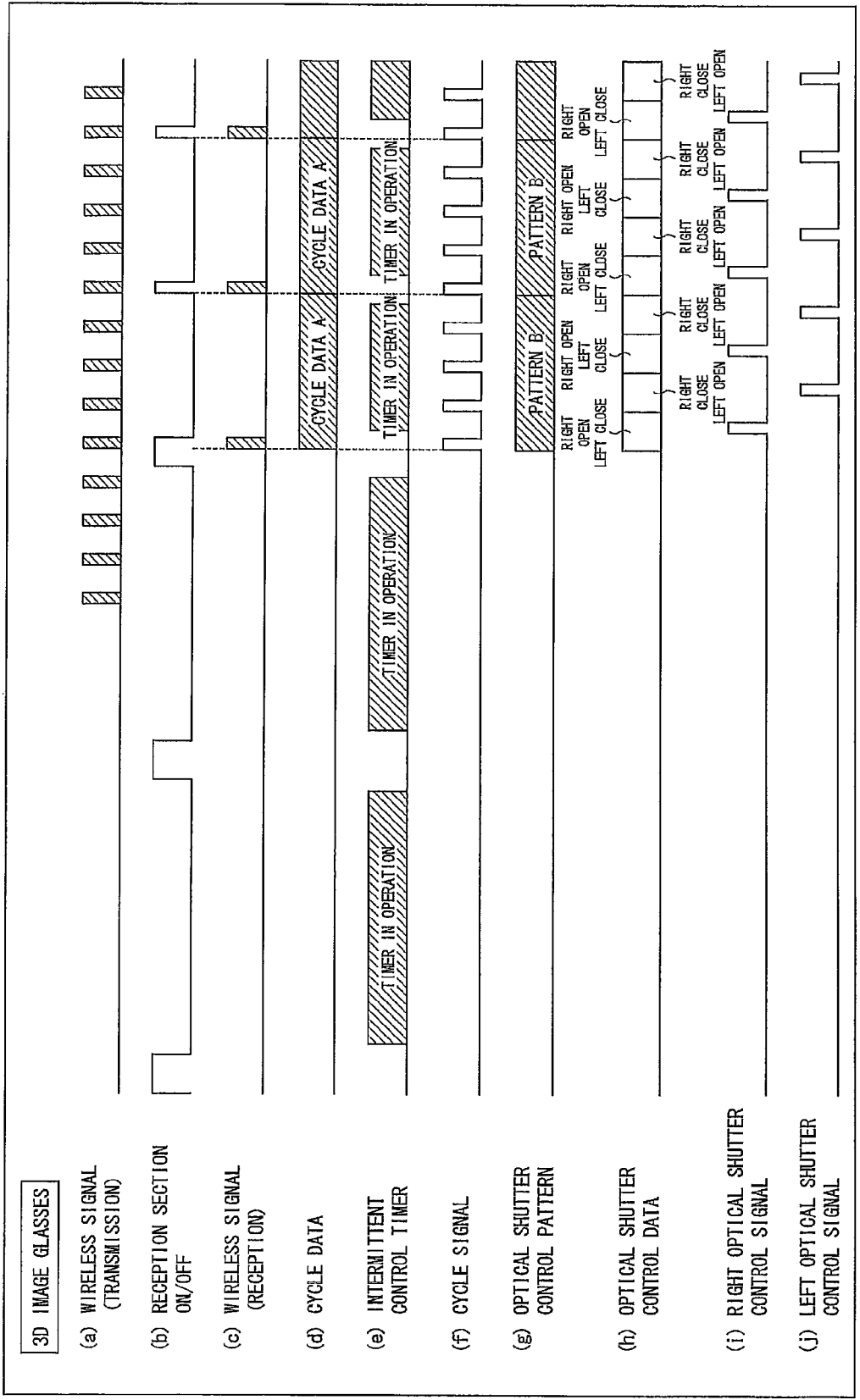

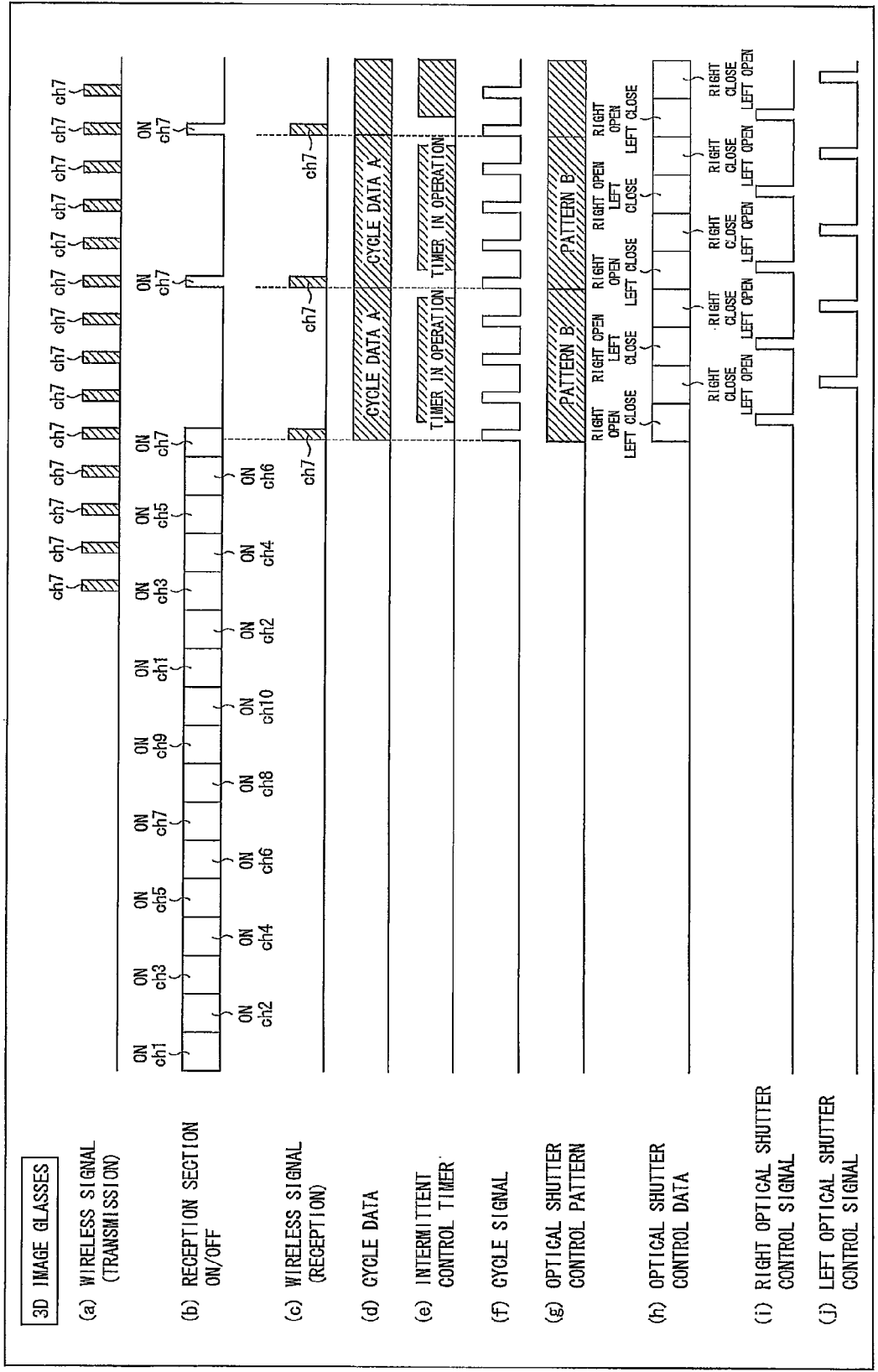

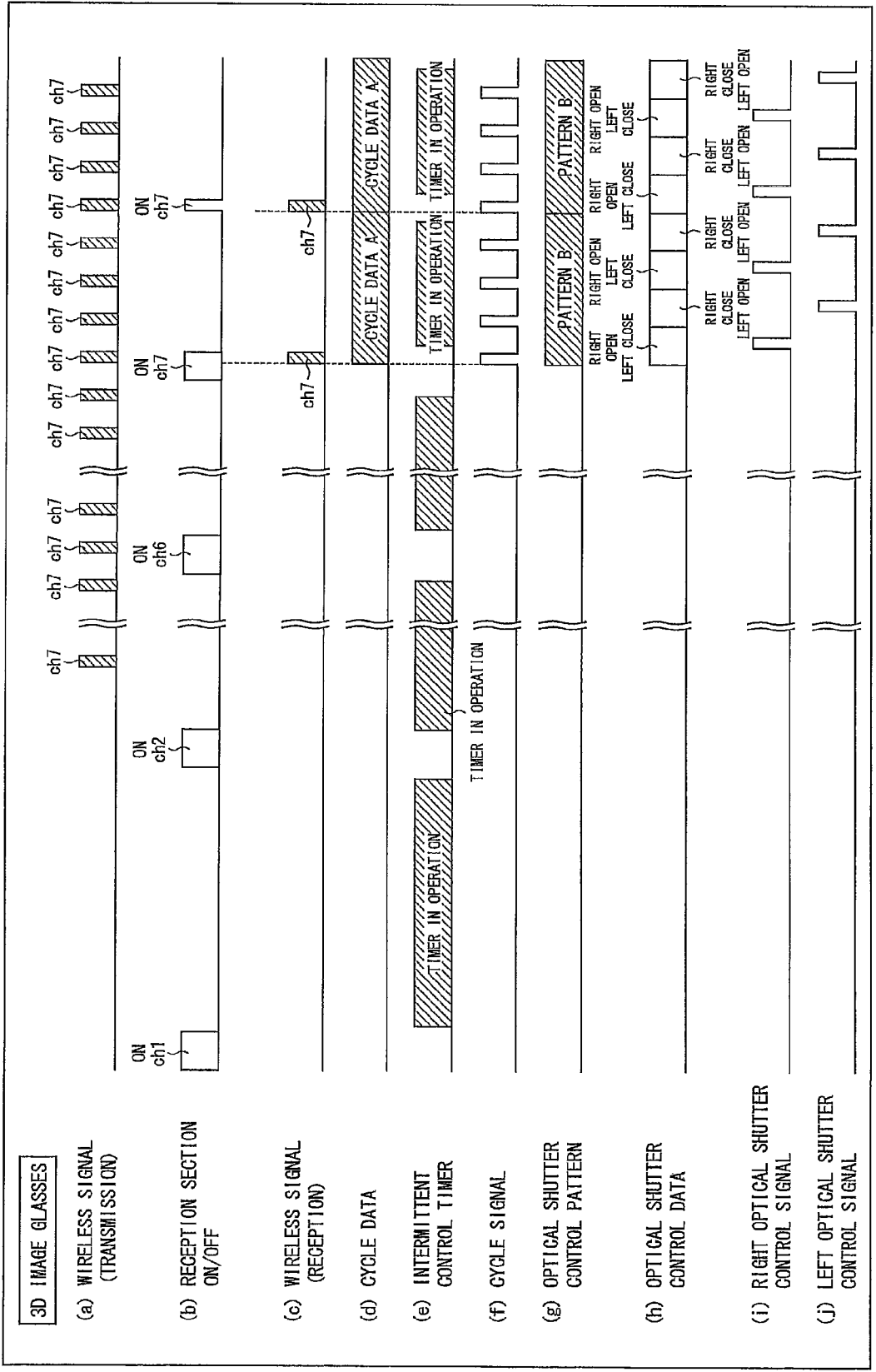

WIRELESS SIGNAL TRANSMISSION DEVICE, 3D IMAGE GLASSES, AND PROGRAM

This Nonprovisional application claims priority under 35 U.S.C. §119(a) on Patent Application No. 2011-127135 filed in Japan on Jun. 7, 2011, the entire contents of which are hereby incorporated by reference.

TECHNICAL FIELD

The present invention relates to a wireless signal transmission device which receives, from an image display device, information for switching a right-eye image and a left-eye image to be displayed by the image display device, and which converts the received information into information to be transmitted to 3D image glasses. Furthermore, the present invention relates to 3D image glasses which receive a signal from the wireless signal transmission device and enable a viewer to view stereoscopically the image displayed by the image display device.

BACKGROUND ART

There have been provided 3D image glasses including optical shutters which alternately transmit a right-eye image and a left-eye image constituting a 3D (three-dimensional) image, and the 3D image glasses enable a viewer to view stereoscopically a 3D image displayed by an image display device, i.e., a stereoscopic image constituted by a right-eye image and a left-eye image. Specifically, when the right-eye image is displayed, the 3D image glasses open a right optical shutter and close a left optical shutter, and when the left-eye image is displayed, the 3D image glasses close the right optical shutter and open the left optical shutter, thereby alternately transmitting the right-eye image and the left-eye image.

In order to make synchronization between operations of the image display device and the 3D image glasses, such as opening of the right optical shutter and closing of the left optical shutter when the right-eye image is displayed, there is frequently used a wireless signal transmission device. Examples of the image display device include television (TV) receivers and personal computers (PCs).

With reference to FIGS. 9 and 10, the following explains a conventional wireless signal transmission device and conventional 3D image glasses. FIG. 9 is a block diagram showing configurations of a conventional wireless signal transmission device and conventional 3D image glasses. FIG. 10 is a timing chart showing timing of control operation of the conventional wireless signal transmission device shown in FIG. 9.

As shown in FIG. 9, a wireless signal transmission device 101 receives, from an image display device 106, a sync signal indicative of timing for switching between display of a right-eye image and display of a left-eye image, signal indicative of which of the right-eye image and the left-eye image is to be displayed, optical shutter control data indicative of timing for controlling right and left optical shutters of 3D image glasses 110 etc. The wireless signal transmission device 101 generates a wireless transmission signal shown in (a) of FIG. 10 based on the sync signal and the optical shutter control data, and transmits the signal to the 3D image glasses 110 via wireless communications such as infrared (IR) communications and radio frequency (RF) communications. (b) of FIG. 10 shows timing at which the image display device 106 displays a right-eye image and a left-eye image.

When receiving the wireless transmission signal via a wireless signal reception section 111, the 3D image glasses 110 cause an optical shutter control timing generation section 112 to generate optical shutter control timing for controlling the optical shutters. Furthermore, an optical shutter control section 113 generates, in accordance with the generated optical shutter control timing, a right optical shutter control signal and a left optical shutter control signal shown in (c) and (d) of FIG. 10 so as to control the right optical shutter and the left optical shutter, respectively. The optical shutter control section 113 controls the right optical shutter and the left optical shutter in accordance with the generated right optical shutter control signal and the generated left optical shutter control signal, respectively.

That is, when the image display device 106 displays the right-eye image, the optical shutter control section 113 opens the right optical shutter and closes the left optical shutter, and when the image display device 106 displays the left-eye image, the optical shutter control section 113 closes the right optical shutter and opens the left optical shutter, thereby enabling a user to view the right-eye image only by the right eye and the left-eye image only by the left eye. Accordingly, alternately repeating opening and closing of the right optical shutter and the left optical shutter enables the user to view a 3D image stereoscopically.

In the above conventional technique, the wireless signal transmission device 101 transmits a wireless signal at timing for switching between the right-eye image and the left-eye image constituting a 3D image displayed by the image display device 106, i.e., timing for switching frames. For example, in a case where frame frequency is 100 Hz, the wireless signal transmission device 101 transmits a wireless signal per 10 ms, and the 3D image glasses 110 receive the wireless signal per 10 ms. Consequently, as the frame frequency is higher, power consumption of the wireless signal reception section 111 in the 3D image glasses 110 is likely to increase.

Furthermore, in most cases, the wireless signal transmission device 101 can always receive power supply from the image display device, whereas the 3D image glasses 110 use battery as a power source. That is, as the frame frequency is higher, operation time of the 3D image glasses 110 are shorter.

In order to deal with this problem, Patent Literature 1 proposes a wireless reception device used in 3D image glasses as mentioned below.

Patent Literature 1 discloses a technique relating to 3D image glasses including: a switch for switching between on and off of a power source supply circuit of a reception section; and switch control means. Specifically, the 3D image glasses are designed to detect the cycle of a wireless transmission signal from a transmission device, calculate, based on the cycle, a period in which the wireless transmission signal is not sent, and make the switch off during the period.

With the arrangement, the 3D image glasses make the switch off during a period in which the wireless transmission signal is not sent out of the aforementioned 10 ms for example, thereby reducing power consumption. Specifically, in a case where a period in which the wireless signal is received is 1 ms out of the aforementioned 10 ms, the remaining 9 ms is set to the period in which the wireless signal is not sent. Consequently, power consumption of the reception section can be reduced substantially one-tenth.

CITATION LIST

[Patent Literature]
[Patent Literature 1]
Japanese Patent Application Publication, Tokukaihei, No. 08-265863 A (published on Oct. 11, 1996)

SUMMARY OF INVENTION

Technical Problem

However, the 3D image glasses described in Patent Literature 1 suffer a problem as follows. The 3D image glasses compare the cycle of the wireless transmission signal from the transmission device and a pulse generated in the 3D image glasses, and switch between on and off of the power supply circuit in accordance with the result of the comparison. Consequently, in a case where the image display device does not display a 3D image and so the transmission device does not transmit a wireless transmission signal, the 3D image glasses cannot compare the wireless transmission signal with the pulse generated in the 3D image glasses, so that the 3D image glasses cannot switch between, on and off of the power source supply circuit, and cannot stop reception of the wireless signal.

In such a case, the power supply circuit must be kept on so as to allow constant reception of the wireless signal. This makes it impossible to reduce power consumption of the reception section.

The present invention was made in view of the foregoing problem. An object of the present invention is to provide a wireless signal transmission and reception technique capable of reducing power consumption of 3D image glasses even when an image display device does not display a 3D image.

Solution to Problem

In order to solve the foregoing problem, a wireless signal transmission device of the present invention includes a wireless signal transmission section for, when an image display device displays a 3D image which is a three-dimensional image including a right-eye image and a left-eye image, transmitting, to 3D image glasses, (i) a first sync signal indicative of timing at which the right-eye image and the left-eye image included in the 3D image are switched and (ii) an optical shutter control signal for controlling optical shutters of the 3D image glasses which optical shutters alternately transmit and shut the right-eye image and the left-eye image, when the image display device displays an image other than a 3D image, the wireless signal transmission section periodically transmitting a certain signal which does not include the optical shutter control signal.

With the arrangement, when the image displayed by the image display device is a 3D image, the wireless signal transmission section of the wireless signal transmission device transmits the first sync signal and the optical shutter control signal, and when the image is not a 3D image (i.e. when the image is a 2D image which is a two-dimensional image or no image is displayed), the wireless signal transmission section periodically transmits the certain signal which does not include at least the optical shutter control signal. Consequently, even when the image displayed by the image display device is not a 3D image, the wireless signal transmission device can periodically transmit the certain signal to the 3D image glasses.

Examples of the case where the image display device displays no image include a case where supply of a 2D image or a 3D image to the image display device (e.g. TV broadcasting in case where the image display device is a TV receiver) has been finished and a case where no power is supplied to the image display device.

With the wireless signal transmission device, the 3D image glasses receive the certain signal, thereby periodically receiving a signal even when the image display device does not display a 3D image. Consequently, the 3D image glasses can reduce power consumption by periodically receiving a signal, even when the image display device does not display a 3D image. Accordingly, the wireless signal transmission device can reduce power consumption of the 3D image glasses even when the image display device does not display a 3D image.

Furthermore, since the 3D image glasses periodically receive (intermittently receive) a wireless signal, the 3D image glasses can keep comprehending a time period in which a wireless signal is transmitted from the wireless signal transmission device and via which channel the wireless signal is transmitted. Accordingly, when the image displayed by the image display device is changed from a 2D image to a 3D image, the 3D image glasses can promptly receive a wireless signal and start to operate.

A 2D image and a 3D image in the present embodiment may be a moving image, a still image, or a combination of a moving image and a still image.

In order to solve the foregoing problem, 3D image glasses of the present invention include a wireless signal reception section for, when an image display device displays a 3D image which is a three-dimensional image including a right-eye image and a left-eye image, receiving (i) a first sync signal indicative of timing at which the right-eye image and the left-eye image included in the 3D image are switched and (ii) an optical shutter control signal for controlling optical shutters which alternately transmit and shut the right-eye image and the left-eye image, when the image display device displays an image other than a 3D image, the wireless signal reception section receiving a certain signal which does not include the optical shutter control signal, the 3D image glasses further comprising a reception intermittent control section for, when the wireless signal reception section receives the first sync signal or the certain signal, controlling the wireless signal reception section to stop receiving a wireless signal for a predetermined time period.

With the arrangement, when the image displayed by the image display device is a 3D image, the wireless signal reception section receives the first sync signal and the optical shutter control signal, and when the image is not a 3D image (i.e. when the image is a 2D image or no image is displayed), the wireless signal reception section receives the certain signal. Furthermore, even when the first sync signal or the certain signal is received, the reception intermittent control means causes the wireless signal reception section to stop receiving a wireless signal for a predetermined time period.

Examples of the case where the image display device displays no image include a case where supply of a 2D image or a 3D image to the image display device (i.e. TV broadcasting in case where the image display device is a TV receiver) has been finished and a case where no power is supplied to the image display device.

Consequently, the reception intermittent control means enables the 3D image glasses to be free from a problem that when the first sync signal and the optical shutter control signal are received, the operation of the wireless signal reception can be stopped for a predetermined time, whereas when the image display device does not display a 3D image, no signal is received and the operation of the wireless signal reception section cannot be stopped for the predetermined time. That is, the reception intermittent control means periodically receives the certain signal even when the image display device does not display a 3D image, thereby stopping the operation of the wireless signal reception section for the predetermined time period.

Even when the image displayed by the image display device is not a 3D image, the reception intermittent control means can stop the operation of the wireless signal reception section intermittently for the predetermined time period. This allows reducing power consumption of the wireless signal reception section.

Advantageous Effects of Invention

As described above, the wireless signal transmission device of the present invention includes a wireless signal transmission section for, when an image display device displays a 3D image which is a three-dimensional image including a right-eye image and a left-eye image, transmitting, to 3D image glasses, (i) a first sync signal indicative of timing at which the right-eye image and the left-eye image included in the 3D image are switched and (ii) an optical shutter control signal for controlling optical shutters of the 3D image glasses which optical shutters alternately transmit and shut the right-eye image and the left-eye image, when the image display device displays an image other than a 3D image, the wireless signal transmission section periodically transmitting a certain signal which does not include the optical shutter control signal.

With the arrangement, the wireless signal transmission device can periodically transmit the certain signal to the 3D image glasses even when the image display device does not display a 3D image. Consequently, the 3D image glasses can reduce power consumption by periodically receiving a signal, even when the image display device does not display a 3D image. Accordingly, the wireless signal transmission device can reduce power consumption of the 3D image glasses even when the image display device does not display a 3D image.

BRIEF DESCRIPTION OF DRAWINGS

FIG. 1 is a block diagram showing a configuration of an image display system in accordance with one embodiment of the present invention.

FIG. 4 is a block diagram showing a configuration of an image display system in accordance with another embodiment of the present invention.

FIG. 6 is a block diagram showing a configuration of an image display system in accordance with still another embodiment of the present invention.

FIG. 15 is a timing chart showing operation of 3D image glasses in a case where an image displayed by the image display device is changed from a 2D image to a 3D image in Comparative Embodiment of the present invention.

FIG. 16 is a timing chart showing operation of 3D image glasses in a case where an image displayed by the image display device is a 2D image and a timer of an intermittent control timer section operates in Comparative Embodiment of the present invention.

FIG. 17 is a timing chart showing operation of 3D image glasses in a case where an image displayed by the image display device is a 2D image and a wireless signal reception section receives a wireless signal while periodically switching reception channels in Comparative Embodiment of the present invention.

FIG. 18 is a timing chart showing operation of 3D image glasses in a case where an image displayed by the image display device is a 2D image, a wireless signal reception section have a plurality of reception channels, and a timer of an intermittent control timer section operates in Comparative Embodiment of the present invention.

DESCRIPTION OF EMBODIMENTS

<Comparative Embodiment>

Figure 11:
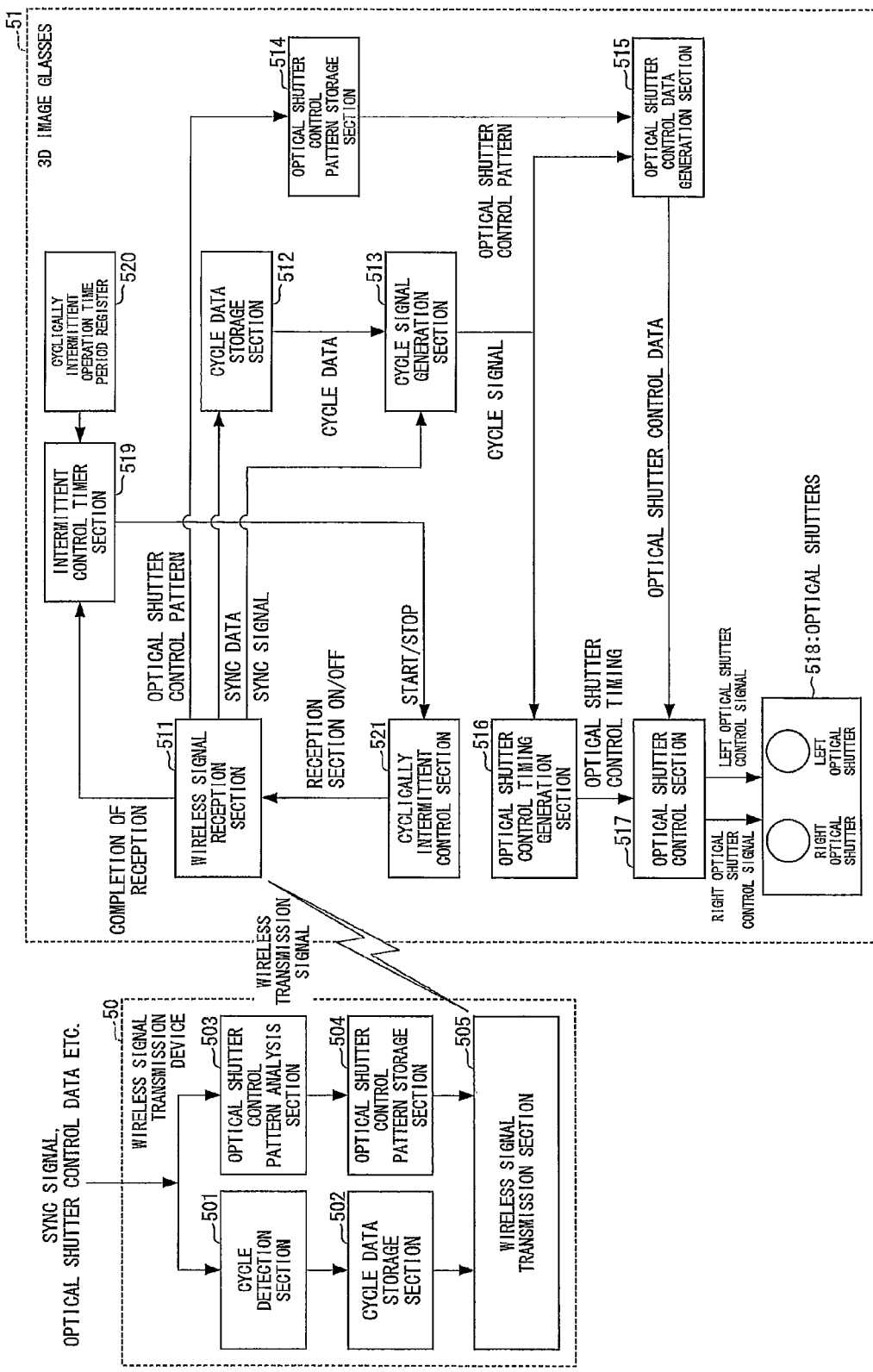
FIG. 11 is a block diagram showing a configuration of an image display system in accordance with Comparative Embodiment of the present invention.

Prior to explaining embodiments of the present invention, a Comparative Embodiment will be explained below which is a technique proposed by the inventors of the present invention for reducing power consumption of 3D image glasses. The technique is intended for reducing the number of reception of a wireless signal by switching between on and off of a reception section which receives the wireless signal and periodically stopping the reception section and during that period, controlling optical shutters in accordance with a sync signal generated in the 3D image glasses. The following explains the technique with reference to FIGS. 11 to 13. FIG. 11 is a block diagram showing a configuration of an image display system including 3D image glasses 51 employing the above technique and a wireless signal transmission device 50 for transmitting a signal from an image display device to the 3D image glasses 51.

(Configurations of Wireless Signal Transmission Device and 3D Image Glasses)

As shown in FIG. 11, the wireless signal transmission device 50 includes a cycle detection section 501, a cycle data storage section 502, an optical shutter control pattern analysis section 503, an optical shutter control pattern storage section 504, and a wireless signal transmission section 505.

The cycle detection section 501 detects a cycle of a sync signal received from the image display device, and stores the cycle as cycle data in the cycle data storage section 502. The optical shutter control pattern analysis section 503 analyzes optical shutter control data received from the image display device and generates optical shutter control pattern information, and stores the optical shutter control pattern information in the optical shutter control pattern storage section 504. Furthermore, the wireless signal transmission section 505 transmits the sync signal, the cycle data, and the optical shutter control pattern information.

Furthermore, as shown in FIG. 11, the 3D image glasses 51 include a wireless signal reception section 511, a cycle data storage section 512, a cycle signal generation section 513, an optical shutter control pattern storage section 514, an optical shutter control data generation section 515, an optical shutter control timing generation section 516, an optical shutter control section 517, optical shutters 518, an intermittent control timer section 519, a cyclically intermittent operation time period register 520, and a cycle intermittent control section 521.

The wireless signal reception section 511 stores, in the cycle data storage section 512, the cycle data received from the wireless signal transmission device 50, and stores, in the optical shutter control pattern storage section 514, the optical shutter control pattern information. The cycle signal generation section 513 generates a cycle signal with reference to the sync signal and in accordance with the cycle data.

The optical shutter control data generation section 515 generates optical shutter control data from the cycle signal and the optical shutter control pattern information. The optical shutter control timing generation section 516 generates optical shutter control timing in accordance with the cycle signal. The optical shutter control section 517 generates a right optical shutter control signal and a left optical shutter control signal in accordance with the optical shutter control data and the optical shutter control timing, thereby controlling operation of the optical shutters 518.

Furthermore, the wireless signal reception section 511 supplies, to the intermittent control timer section 519, a reception signal ("completion of reception" in FIG. 11) indicative of reception of the sync signal. Upon reception of the reception signal, the intermittent control timer section 519 reads out, from the cyclically intermittent operation time period register 520, a predetermined time period indicative of a time period in which wireless reception is stopped (this time period may be hereinafter referred to as "stop-time data") and causes a timer to operate. While the timer operates, the intermittent control timer section 519 supplies a timer operation signal to the cycle intermittent control section 521. While the timer operation signal is supplied, the cycle intermittent control section 521 controls the wireless signal reception section 511 to stop receiving a wireless signal (makes the wireless signal reception section 511 off), and while the timer operation signal is not supplied, the cycle intermittent control section 521 controls the wireless signal reception section 511 to receive a wireless signal (makes the wireless signal reception section 511 on).

With the arrangement, for example, with respect to a signal of 100 Hz, the wireless signal reception section 511 is made on only 1 ms out of 100 ms to receive a wireless signal, and during other time period (99 ms), the optical shutters are controlled in accordance with the cycle signal generated by the cycle signal generation section 513. This allows reducing power consumption one-hundredth.

(Operation of Wireless Signal Transmission Device)

Figure 12:
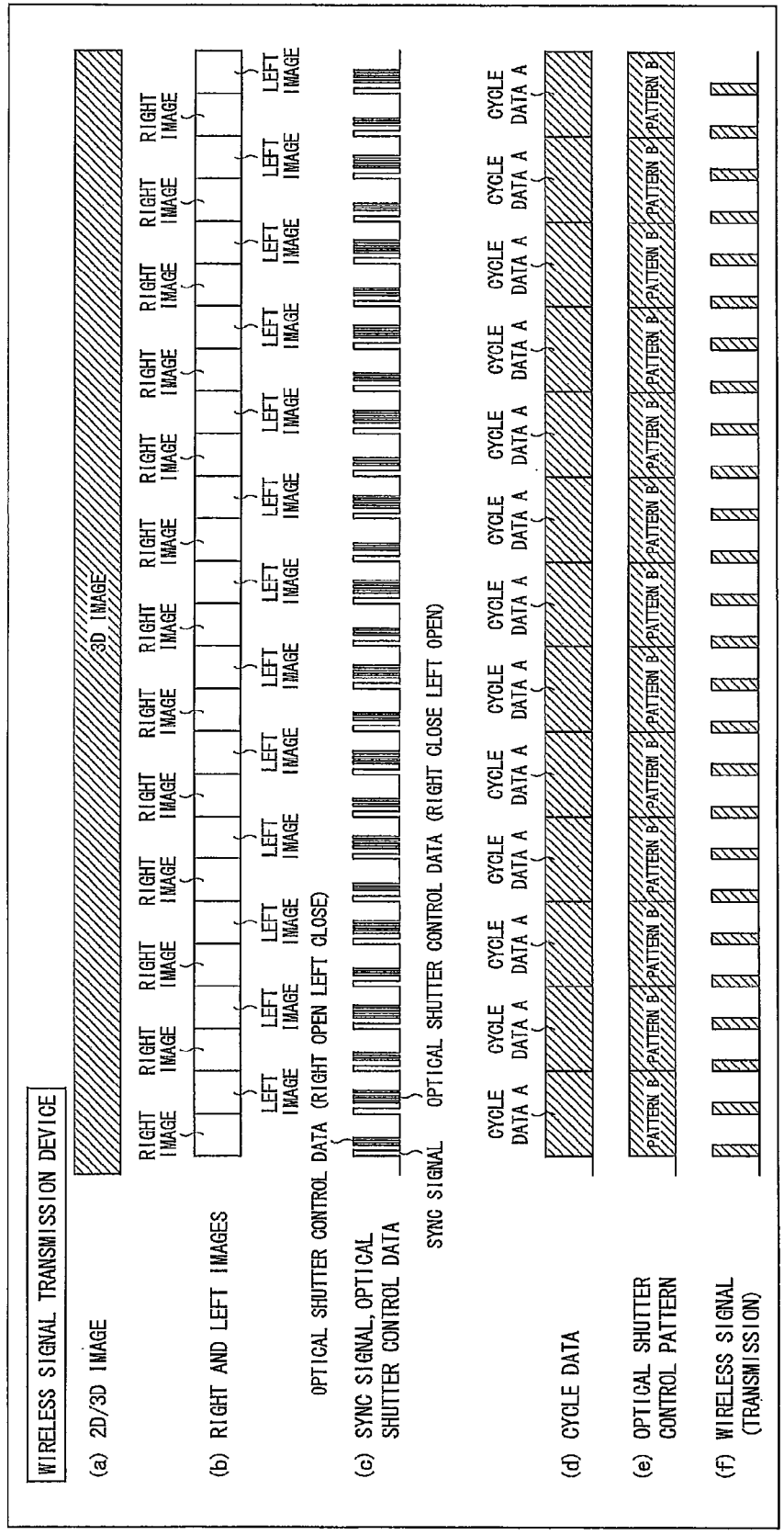
FIG. 12 is a timing chart showing operation of a wireless signal transmission device in a case where the image display device in accordance with Comparative Embodiment of the present invention displays a 3D image.

With reference to FIG. 12, the following explains the operation of the wireless signal transmission device 50. FIG. 12 is a timing chart showing the operation of the wireless signal transmission device 50 in a case where the image display device displays a 3D image which can be viewed stereoscopically by a viewer.

When displaying a 3D image as shown in (a) of FIG. 12, the image display device alternately displays a right-eye image and a left-eye image as shown in (b) of FIG. 12.

As shown in (c) of FIG. 12, the wireless signal transmission device 50 receives, from the image display device, a sync signal indicative of timing for switching a right-eye image and a left-eye image constituting a 3D image and optical shutter control data indicative of timing for opening and closing the optical shutters 518 of the 3D image glasses 51.

Upon reception of the sync signal, the cycle detection section 501 generates cycle data shown in (d) of FIG. 12 (cycle data A), and stores the cycle data in the cycle data storage section 502.

Upon reception of the optical shutter control data, the optical shutter control pattern analysis section 503 generates optical shutter control pattern information shown in (e) of FIG. 12 (pattern B), and stores the optical shutter control pattern information in the optical shutter control pattern storage section 504.

The wireless signal transmission section 505 reads out the cycle data and the optical shutter control pattern information, and periodically supplies the cycle data and the optical shutter control pattern information to the 3D image glasses 51 as shown in (f) of FIG. 12.

(Operation of 3D Image Glasses)

Figure 13:
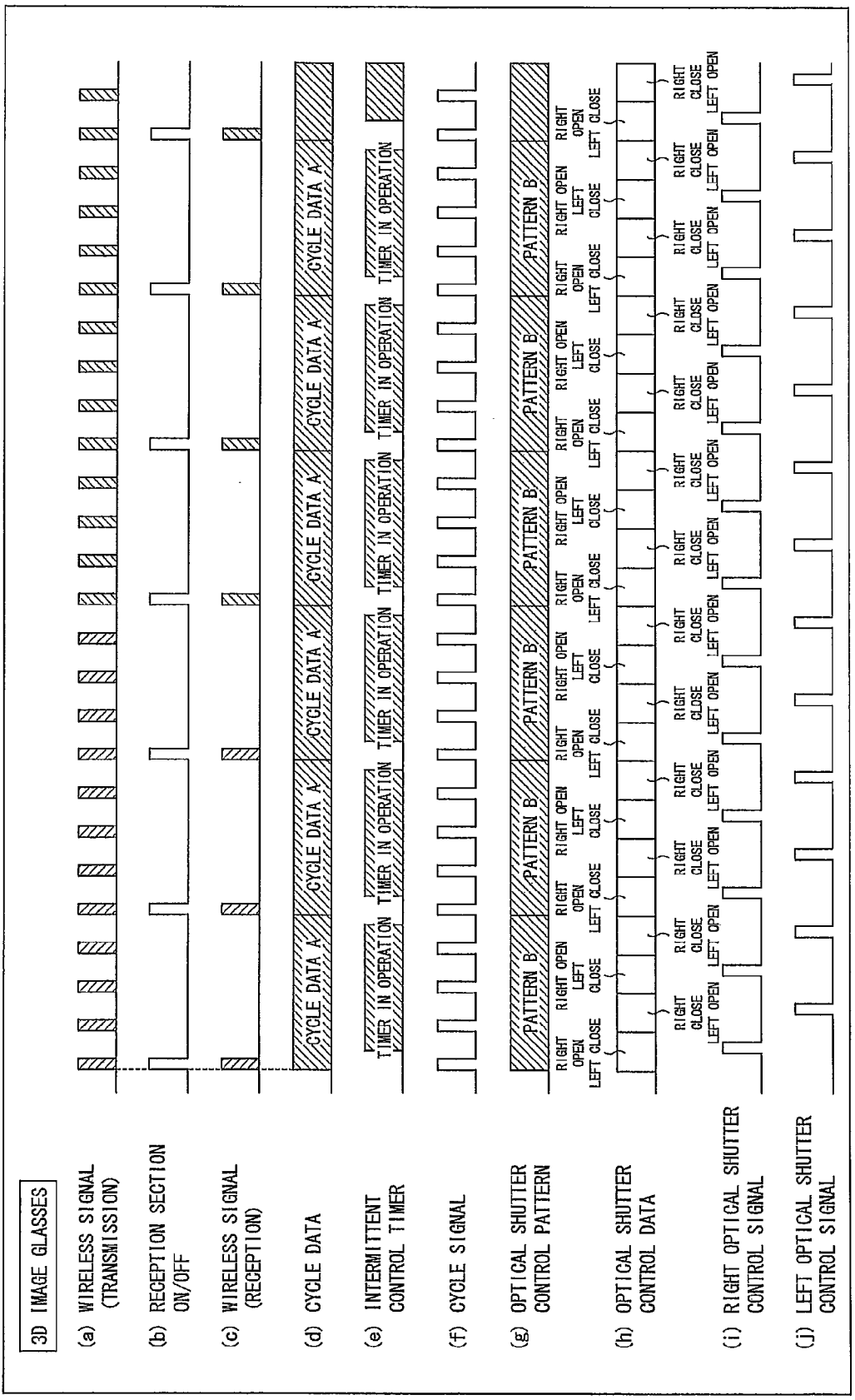
FIG. 13 is a timing chart showing operation of 3D image glasses in a case where the image display device in accordance with Comparative Embodiment of the present invention displays a 3D image.

With reference to FIG. 13, the following explains the operation of the 3D image glasses 51. FIG. 13 is a timing chart showing the operation of the 3D image glasses 51 in a case where the image display device displays a 3D image.

The wireless signal reception section 511 receives a sync signal (not shown) and supplies the received sync signal to the cycle signal generation section 513. Furthermore, the wireless signal reception section 511 supplies a reception signal indicative of reception of the sync signal to the intermittent control timer section 519.

Upon reception of the reception signal, the intermittent control timer section 519 reads out stop-time data from the cyclically intermittent operation time period register 520, and causes the timer to operate for a predetermined time period. Furthermore, while the timer operates, the intermittent control timer section 519 supplies the timer operation signal shown in (e) of FIG. 13 to the cyclically intermittent control section 521.

As shown in (b) of FIG. 13, when the timer operation signal is not supplied, the cyclically intermittent control section 521 supplies a reception section-ON signal to the wireless signal reception section 511. Only while the reception section-ON signal is supplied, the wireless signal reception section 511 receives a wireless signal. When the reception section-ON signal ceases to be supplied, the wireless signal reception section 511 stops receiving the wireless signal.

As described above, the wireless signal reception section 511 repeats two operations of (i) stopping receiving a wireless signal while the timer of the intermittent control timer section 519 operates and (ii) receiving the wireless signal while the timer stops.

Consequently, as shown in (c) of FIG. 13, the wireless signal reception section 511 can periodically receive a part of a wireless signal transmitted from the wireless signal transmission device 50 shown in (a) of FIG. 13. Accordingly, it is possible to reduce power consumption of the wireless signal reception section 511 while the wireless signal reception section 511 does not receive the wireless signal.

Furthermore, the wireless signal reception section 511 receives cycle data shown in (d) of FIG. 13, and stores the received cycle data in the cycle data storage section 512. The cycle signal generation section 513 generates, with reference to the sync signal, the cycle signal shown in (f) of FIG. 13 from the cycle data stored in the cycle data storage section 512, and supplies the generated cycle signal to the optical shutter control data generation section 515 and the optical shutter control timing generation section 516.

The optical shutter control data generation section 515 generates, with reference to the cycle signal, the optical shutter control data shown in (h) of FIG. 13 from the optical shutter control pattern shown in (g) of FIG. 13 (optical shutter control pattern information) stored in the optical shutter control pattern storage section 514, and supplies the optical shutter control data to the optical shutter control section 517. Furthermore, the optical shutter control timing generation section 516 generates optical shutter control timing in accordance with the cycle signal, and supplies the optical shutter control timing to the optical shutter control section 517.

The optical shutter control section 517 generates the right optical shutter control signal shown in (i) of FIG. 13 and the left optical shutter control signal shown in (j) of FIG. 13 in accordance with the optical shutter control data and the optical shutter control timing. The optical shutter control section 517 supplies the generated right optical shutter control signal and left optical shutter control signal to the optical shutters 518 so that the right optical shutter and the left optical shutter are opened and closed in accordance with the signals.

However, the aforementioned technique of reducing power consumption of the wireless signal reception section 511 of the 3D image glasses 51 is available only when the image display device displays a 3D image. Specifically, when the image display device displays an image other than a 3D image, a sync signal for a 3D image is not transmitted from the wireless signal transmission device 50, and consequently the 3D image glasses 51 must continue to put the wireless signal reception section in an on-state so as to always receive a wireless signal. Therefore, when the image display device displays an image other than a 3D image, it is impossible to reduce power consumption of the 3D image glasses 51.

[Operation of Switching Between 2D Image and 3D Image]

The above problem is specifically explained below. With reference to FIGS. 14 to 18, the following explains the operations of the wireless signal transmission device 50 and the 3D image glasses 51 in a case where an image displayed by the image display device is changed from a 2D image for a plane view to a 3D image in the image display system in accordance with the present Comparative Embodiment.

(Operation of Wireless Signal Transmission Device)

Figure 14:
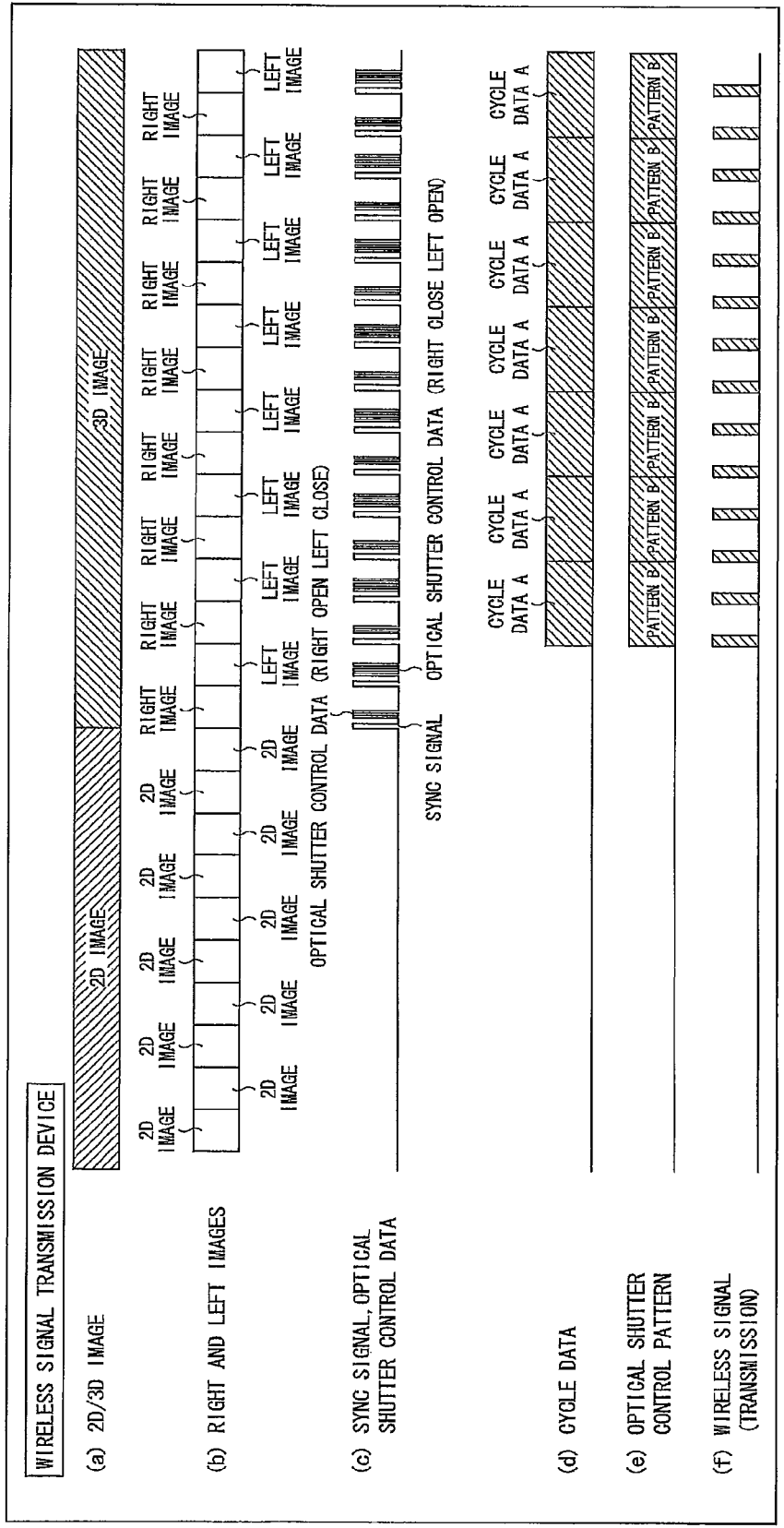
FIG. 14 is a timing chart showing operation of a wireless signal transmission device in a case where an image displayed by the image display device is changed from a 2D image to a 3D image in Comparative Embodiment of the present invention.

Initially, an explanation is made as to the operation of the wireless signal transmission device 50 with reference to FIG. 14. FIG. 14 is a timing chart showing the operation of the wireless signal transmission device 50 in the case where an image displayed by the image display device is changed from a 2D image to a 3D image.

When displaying a 2D image as shown in (a) of FIG. 14, the image display device switches and displays frame images constituting a 2D image as shown in (b) of FIG. 14.

Further, when the image display device displays a 2D image as shown in (a) of FIG. 14, the wireless signal transmission device 50 does not receive any signals (sync signal and optical shutter control data) from the image display device as shown in (c) of FIG. 14. Consequently, the wireless signal transmission device 50 does not generate any of cycle data and optical shutter control pattern information as shown in (d) and (e) of FIG. 14, and the wireless signal transmission section 505 does not transmit any signal as shown in (f) of FIG. 14.

The operation of the wireless signal transmission device 50 after the image displayed by the image display device is changed from a 2D image to a 3D image has been already explained above.

(Operation 1 of 3D Image Glasses)

Next, with reference to FIG. 15, an explanation is made below as to the operation of the 3D image glasses 51. FIG. 15 is a timing chart showing the operation of the 3D image glasses 51 in the case where the image displayed by the image display device is changed from a 2D image to a 3D image.

When the image display device displays a 2D image, no signal is transmitted from the wireless signal transmission device 50 as shown in (a) of FIG. 15, and accordingly the wireless signal reception section 511 receives no signal as shown in (c) of FIG. 15. Since the wireless signal reception section 511 receives no signal, the timer of the intermittent control timer section 519 which timer determines a period in which the operation of the wireless signal reception section 511 is stopped does not operate as shown in (e) of FIG. 15. Consequently, the 3D image glasses 51 must continue to put the wireless signal reception section 511 in an on-state so as to always receive a wireless signal.

Furthermore, since cycle data and optical shutter control pattern information are not received as shown in (d) and (g) of FIG. 15, a cycle signal and optical shutter control data are not generated as shown in (f) and (h) of FIG. 15, and a right optical shutter control signal and a left optical shutter control signal are not generated as shown in (i) and (j) of FIG. 15.

The operation of the 3D image glasses 51 after the image displayed by the image display device is changed from a 2D image to a 3D image has been already explained above.

(Operation 2 of 3D Image Glasses)

One option to solve the above problem is, for example, making the wireless signal reception section 511 off per a predetermined time using a timer, thereby reducing power consumption. With reference to FIG. 16, an explanation is made as to the operation of the 3D image glasses 51 in a case where the wireless signal reception section 511 is made off per a predetermined time using a timer. FIG. 16 is a timing chart showing the operation of the 3D image glasses 51 in a case where the image displayed by the image display device is a 2D image and the timer of the intermittent control timer section 519 operates in the present Comparative Embodiment.

Even when the image display device does not display a 2D image and the wireless signal transmission device 50 does not transmit a wireless signal as shown in (a) of FIG. 16, the intermittent control timer section 519 causes the timer to operate as shown in (e) of FIG. 16. At that time, in order to cause the timer to operate, the intermittent control timer section 519 reads out, from the cyclically intermittent operation time period register 520, data indicative of a time period in which the reception operation of the wireless signal reception section is to be stopped. The data read out here may be the same as the stop-time data read out when the image display device displays a 3D image or may be different data.

Since the timer of the intermittent control timer section 519 operates and a timer operation signal is supplied to the cyclically intermittent control section 521, the wireless signal reception section 511 is made off while the timer operates and the wireless signal reception section 511 is made on while the timer does not operate.

However, in such a case, since it is necessary to receive a signal transmitted from the wireless signal transmission device 50 after the image displayed by the image display device is changed from a 2D image to a 3D image, it is necessary to set a time period in which the wireless signal reception section 511 is made on to be longer than the cycle of transmission of a signal from the wireless signal transmission device 50. For example, in a case where the cycle of transmission of a signal from the wireless signal transmission device 50 is 100 Hz, the wireless signal reception section 511 may be made on for 10 ms and made off for 90 ms. However, in this case, power consumption is reduced to only one-tenth.

When the wireless signal reception section 511 is made on for 10 ms and made off for 990 ms, power consumption can be reduced to one-hundredth. However, in this case, when the image displayed by the image display device is changed from a 2D image to a 3D image, reception of a signal by the wireless signal reception section 511 is delayed by 990 ms at most.

(Operation 3 of 3D Image Glasses)

Furthermore, the above problem is worsen when the wireless signal transmission device 50 and the 3D image glasses 51 are designed to allow transmission and reception of a signal while switching a plurality of channels. For example, in a case where it is possible to switch a plurality of channels, it is impossible to determine whether a wireless signal is not transmitted from the wireless signal transmission device 50 or a wireless signal is transmitted via a channel other than the channel to which the wireless signal reception section 511 tunes. Consequently, it is necessary for the wireless signal reception section 511 to receive a signal while periodically switching channels.

With reference to FIG. 17, an explanation is made as to reception of a signal by the wireless signal reception section 511 while periodically switching channels (in FIG. 17, a channel is abbreviated as "ch"). FIG. 17 is a timing chart showing the operation of the 3D image glasses 51 in a case where the image displayed by the image display device is a 2D image and the wireless signal reception section 511 receives a signal while periodically switching channels.

As an example, an explanation is made here as to a case the wireless signal transmission device 50 and the 3D image glasses 51 are designed to have 10 switchable channels, and a wireless signal transmitted from the wireless signal transmission device 50 when the image displayed by the image display device is changed from a 2D image to a 3D image is transmitted via a channel 7.

As shown in (b) of FIG. 17, the wireless signal reception section 511 carries out reception operation while periodically switching all channels from a channel 1 to a channel 10. In a case where a wireless signal is transmitted from the wireless signal transmission device 50 via a channel 7 as shown in (a) of FIG. 17 while the reception channel is a channel 3 as shown in (b) of FIG. 17, it is impossible to receive the wireless signal until the reception channel is switched to the channel 7.

Accordingly, in the case of the arrangement in which a signal is transmitted and received while a plurality of channels are switched, not only power consumption cannot be reduced but also reception of a wireless signal is delayed. For example, in a case where there are 10 channels and each channel is selected for 10 ms, power consumption cannot be reduced and reception of a wireless signal may be delayed for 90 ms at most.

(Operation 4 of 3D Image Glasses)

The configuration in which the wireless signal transmission device 50 and the 3D image glasses 51 are designed to allow transmission and reception of a signal while switching a plurality of channels may be arranged such that each channel is selected and then no channel is selected for a predetermined time. With reference to FIG. 18, an explanation is made as to the operation of the 3D image glasses 51 in a case where the wireless signal reception section 511 has a plurality of reception channels and the wireless signal reception section 511 is made off per a predetermined time using a timer (in FIG. 18, a channel is abbreviated as "ch"). FIG. 18 is a timing chart showing the operation of the 3D image glasses 51 in a case where the image displayed by the image display device is a 2D image, the wireless signal reception section 511 has a plurality of channels, and the timer of the intermittent control timer section 519 operates.

As an example, an explanation is made here as to a case where the wireless signal transmission device 50 and the 3D image glasses 51 are designed to have 10 switchable channels, and that a wireless signal transmitted from the wireless signal transmission device 50 when the image displayed by the image display device is changed from a 2D image to a 3D image is transmitted via the channel 7.

As shown in (e) of FIG. 18, the intermittent control timer section 519 reads out, from the cyclically intermittent operation time period register 520, data indicative of a time period in which the reception operation of the wireless signal reception section 511 is to be stopped, and causes the timer to operate. At that time, the wireless signal reception section 511 carries out the reception operation while periodically switching the reception channels from the channel 1 to the channel 10 as shown in (b) of FIG. 18, and the cyclically intermittent control section 521 periodically switches the wireless signal reception section 511 between an on-state and an off-state.

When a wireless signal is transmitted from the wireless signal transmission device 50 via the channel 7 as shown in (a) of FIG. 18 while the reception channel of the wireless signal reception section 511 is the channel 2 as shown in (b) of FIG. 18, it is impossible for the wireless signal reception section 511 to receive the wireless signal until the reception channel is switched to the channel 7.

Assume that, for example, the cycle of transmission of a signal by the wireless signal transmission device 50 is 100 Hz, there are 10 reception channels, each channel is selected for 10 ms and then no channel is selected for 990 ms. In that case, power consumption is reduced to one-hundredth, but reception of the wireless signal may be delayed 9990 ms at most.

As described above, the 3D image glasses and the wireless signal reception device in accordance with the Comparative Embodiment cannot reduce power consumption, and even if power consumption can be reduced to some extent, reception of a wireless signal is delayed greatly when the image displayed by the image display device is changed from a 2D image to a 3D image.

In the Comparative Embodiment, an explanation is made as to a case where the image displayed by the image display device is changed from a 2D image to a 3D image. The same is applied to a case where the image is changed from a 3D image to a 2D image. That is, also in the case where the image displayed by the image display device is changed from a 3D image to a 2D image, a sync signal is not received while the 2D image is displayed, and therefore the wireless signal reception section must continue to be in the on-state so as to always receive a wireless signal.

In order to deal with this problem, the present invention provides a technique capable of reducing power consumption of a wireless signal reception section of 3D image glasses regardless of whether an image displayed by an image display device is 3D image or not.

<Embodiment 1>

Figure 2:
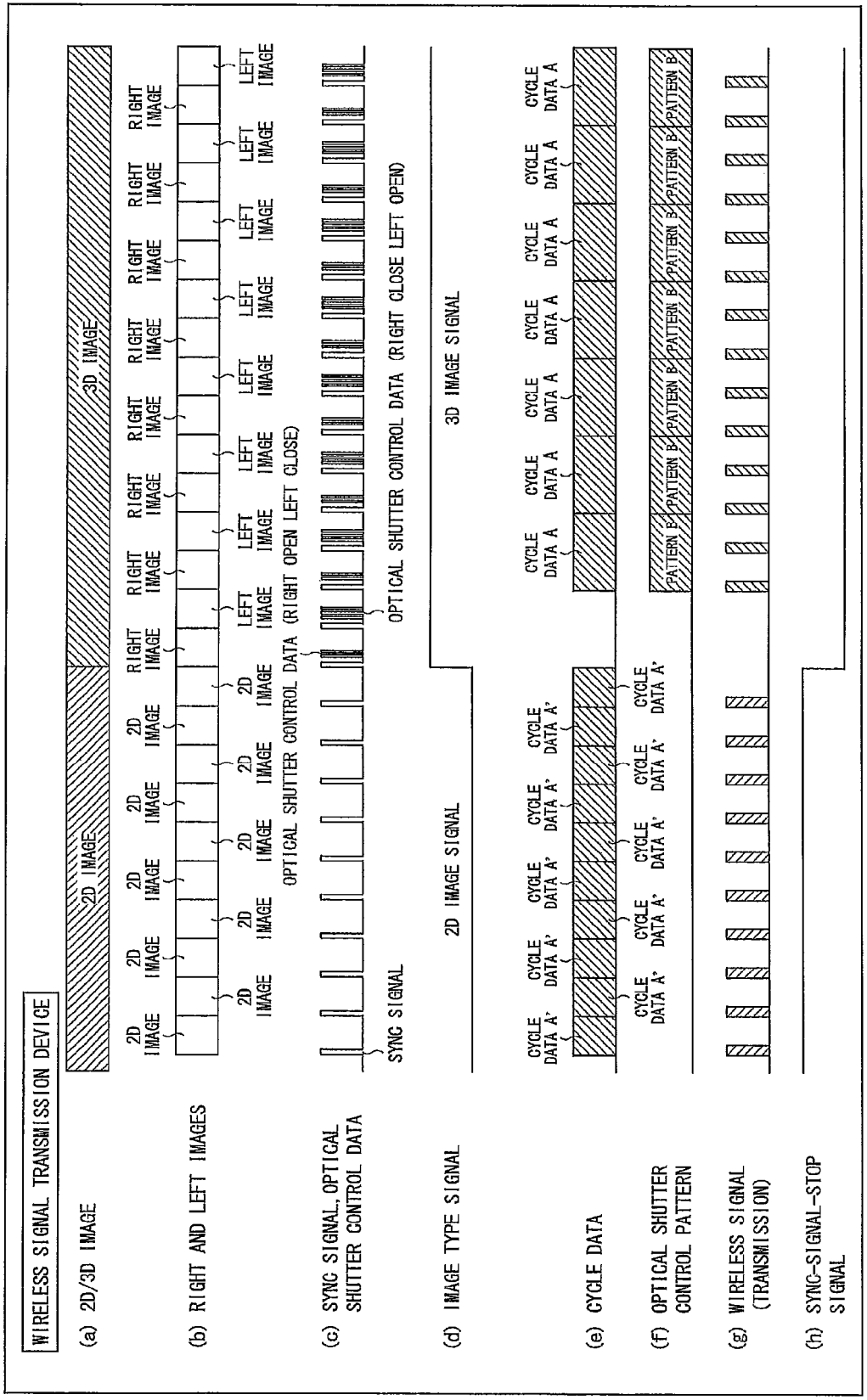
FIG. 2 is a timing chart showing operation timing of a wireless signal transmission device in accordance with one embodiment of the present invention.
Figure 3:
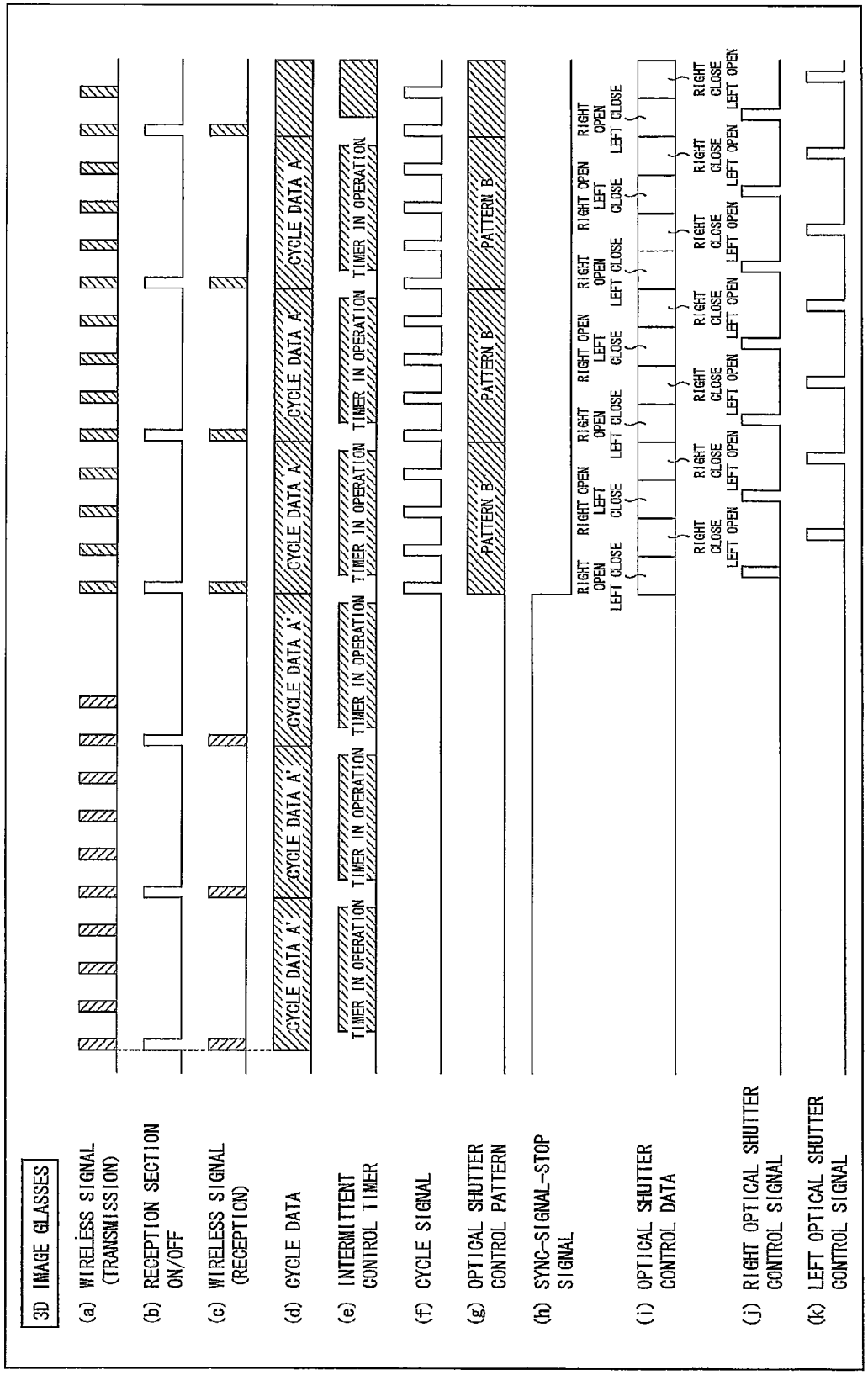
FIG. 3 is a timing chart showing operation timing of 3D image glasses in accordance with one embodiment of the present invention.

With reference to FIGS. 1 to 3, the following explains one embodiment of a wireless signal transmission device of the present invention. It should be noted that the Embodiment is merely an example and the present invention is not limited to the Embodiment unless otherwise stated.

[Configuration of Image Display System]

Initially, with reference to FIG. 1, an explanation is made as to an image display system including a wireless signal transmission device in accordance with the present embodiment. FIG. 1 is a block diagram showing a configuration of an image display system in accordance with the present embodiment. As shown in FIG. 1, an image display system 1 in accordance with the present embodiment includes a wireless signal transmission device 20 connected with an image display device (not shown), and 3D image glasses 30.

Examples of the image display device include television (TV) receivers and personal computers (PC).

(Configuration of Wireless Signal Transmission Device)

Initially, an explanation is made as to the wireless signal transmission device 20 included in the image display system 1. As shown in FIG. 1, the wireless signal transmission device 20 includes a reception section 201, a cycle detection section (first cycle detection means, second cycle detection means) 202, a cycle data storage section (first cycle data storage section) 203, an optical shutter control pattern analysis section (optical shutter control pattern analysis means) 204, an optical shutter control pattern storage section 205, and a wireless signal transmission section 206.

The reception section 201 receives, from the image display device, a sync signal (first sync signal, second sync signal), optical shutter control data (optical shutter control data), an image type signal etc. The image type signal is a signal indicative of whether an image displayed by the image display device is a 3D image (three-dimensional image) which is viewable stereoscopically and which includes a right-eye image and a left-eye image or a 2D image (two-dimensional image) which is a plane image and which includes a frame image.

A sync signal received when the image displayed by the image display device is a 3D image indicates timing at which the right-eye image and the left-eye image included in the 3D image displayed by the image display device are switched. A sync signal received when the image displayed by the image display device is a 2D image indicates timing at which frame images displayed by the image display device are switched. The sync signal received when the image displayed by the image display device is a 3D image may be also referred to as a 3D sync signal (first sync signal) and the sync signal received when the image displayed by the image display device is a 2D image may be also referred to as a 2D sync signal (second sync signal).

A 2D image and a 3D image in the present embodiment may be a moving image, a still image, or a combination of a moving image and a still image.

The 3D sync signal is a sync signal when the image displayed by the image display device is a 3D image, and indicates timing at which a right-eye image and a left-eye image included in the 3D image displayed by the image display device are switched. Further, the 2D sync signal is a sync signal when the image displayed by the image display device is a 2D image, and indicates timing at which frame images displayed by the image display device are switched.

The optical shutter control data is a signal indicative of timing for opening and closing a right optical shutter and a left optical shutter of the 3D image glasses 30 in a case where the image displayed by the image display device is a 3D image. The optical shutter control data indicates "opening the right optical shutter" of the optical shutters of the later-mentioned 3D image glasses 30 when a right-eye image is displayed, and "opening the left optical shutter" when a left-eye image is displayed.

The cycle detection section 202 analyzes the interval of the sync signal received via the reception section 201 to detect the cycle of the sync signal, and stores the detected cycle as cycle data (first cycle data, second cycle data) in the cycle data storage section 203. Furthermore, the cycle detection section 202 updates the cycle data stored in the cycle data storage section 203 every time when the cycle detection section 202 detects the cycle of the sync signal.

The optical shutter control pattern analysis section 204 analyzes repeated patterns of optical shutter control data received via the reception section 201 to generate optical shutter control pattern information, and stores the optical shutter control pattern information in the optical shutter control pattern storage section 205. Furthermore, the optical shutter control pattern analysis section 204 updates the optical shutter control pattern information stored in the optical shutter control pattern storage section 205 every time when the optical shutter control pattern analysis section 204 generates the optical shutter control pattern information.

In a case where the image type signal received via the reception section 201 indicates that the image displayed by the image display device is a 3D image, the wireless signal transmission section 206 reads out the cycle data from the cycle data storage section 203 and the optical shutter control pattern information from the optical shutter control pattern storage section 205. The wireless signal transmission section 206 transmits the cycle data and the optical shutter control pattern information (optical shutter control signal) thus read out to the 3D image glasses 30.

In a case where the image type signal received via the reception section 201 indicates that the image displayed by the image display device is not a 3D image (the image displayed by the image display device is a 2D image), the wireless signal transmission section 206 generates a sync-signal-stop signal. The sync-signal-stop signal is a signal indicating that the image displayed by the image display device is not a 3D image (certain signal). The wireless signal transmission section 206 transmits the generated sync-signal-stop signal.

(Configuration of 3D Image Glasses)

Next, an explanation is made as to the 3D image glasses 30 included in the image display system 1. As shown in FIG. 1, the 3D image glasses 30 include a wireless signal reception section 301, a cycle data storage section 302, a cycle signal generation section (cycle signal generation means) 303, an optical shutter control pattern storage section 304, an optical shutter control data generation section (optical shutter control data generation means) 305, an optical shutter control timing generation section (optical shutter control timing generation means) 306, an optical shutter control section (optical shutter control means) 307, optical shutters 308, an intermittent control timer section (timer control means) 309, a cyclically intermittent operation time period register (register) 310, a cyclically intermittent control section (reception intermittent control means) 311, and a sync-signal-stop signal storage section 312.

The wireless signal reception section 301 receives, from the wireless signal transmission device 20, wireless signals such as optical shutter control pattern information, cycle data, a sync signal, and a sync-signal-stop signal. The wireless signal reception section 301 stores the received cycle data, the received optical shutter control pattern information, and the received sync-signal-stop signal in the cycle data storage section 302, the optical shutter control pattern storage section 304, and the sync-signal-stop signal storage section 312, respectively. Furthermore, the wireless signal reception section 301 supplies the received sync signal to the cycle signal generation section 303.

The cycle signal generation section 303 reads out the cycle data stored in the cycle data storage section 302, and generates a cycle signal with reference to the sync signal supplied from the wireless signal reception section 301. The cycle signal generation section 303 supplies the generated cycle signal to the optical shutter control data generation section 305 and the optical shutter control timing generation section 306. Furthermore, in a case where a sync-signal-stop signal is stored in the sync-signal-stop signal storage section 312, the cycle signal generation section 303 stops generation of a sync signal.

The optical shutter control data generation section 305 reads out the optical shutter control pattern information stored in the optical shutter control pattern storage section 304, and generates optical shutter control data with reference to the cycle signal supplied from the cycle signal generation section 303. The optical shutter control data generation section 305 supplies the generated optical shutter control data to the optical shutter control section 307.

The optical shutter control timing generation section 306 generates optical shutter control timing with reference to the cycle signal supplied from the cycle signal generation section 303, and supplies the generated optical shutter control timing to the optical shutter control section 307.

The sync-signal-stop signal received by the wireless signal reception section 301 is stored in the sync-signal-stop signal storage section 312. When the sync-signal-stop signal is not received by the wireless signal reception section 301, the sync-signal-stop signal stored in the sync-signal-stop signal storage section 312 is deleted.

When the sync-signal-stop signal is stored in the sync-signal-stop signal storage section 312, the sync-signal-stop signal storage section 312 supplies, to the cycle signal generation section 303 and the optical shutter control section 307, a signal indicating that the sync-signal-stop signal is stored, and when not stored, the sync-signal-stop signal storage section 312 supplies a signal indicating that the sync-signal-stop signal is not stored.

When the sync-signal-stop signal is not stored in the sync-signal-stop signal storage section 312, the optical shutter control section 307 generates an optical shutter control signal in accordance with the optical shutter control timing supplied from the optical shutter control timing generation section 306 and the optical shutter control data supplied from the optical shutter control data generation section 305. The optical shutter control signal includes a right optical shutter control signal for controlling the right optical shutter and a left optical shutter control signal for controlling the left optical shutter. The optical shutter control section 307 supplies the generated optical shutter control signal to the optical shutters 308. On the other hand, when the sync-signal-stop signal is stored in the sync-signal-stop signal storage section 312, the optical shutter control section 307 supplies, to the optical shutters 308, an optical shutter control signal for instructing the optical shutters 308 to open both of the right and left optical shutters.

The optical shutters 308 operate in such a manner as to alternately open the right optical shutter and the left optical shutter in accordance with the optical shutter control signal including the right optical shutter control signal and the left optical shutter control signal supplied from the optical shutter control section 307. When the image display device displays a right-eye image, the optical shutters 308 open the right optical shutter to transmit the right-eye image, and close the left optical shutter to shut the right-eye image. When the image display device displays a left-eye image, the optical shutters 308 open the left optical shutter to transmit the left-eye image, and close the right optical shutter to shut the left-eye image. Furthermore, when the optical shutters 308 receive an optical shutter control signal for instructing the optical shutters 308 to open both of the right and left optical shutters, the optical shutters 308 open both of the right and left optical shutters.

The optical shutters 308 include liquid crystal (so-called liquid crystal shutters), and open and close the right liquid crystal shutter and the left liquid crystal shutter to transmit and shut light, thereby transmitting and shutting the right-eye image and the left-eye image. The present invention is not limited to this, and the optical shutters 308 may be made of PLZT (lead lanthanum zirconate titanate) or may be mechanical shutters such as blinds.

The intermittent control timer section 309 includes a timer for managing a time period in which wireless reception is carried out intermittently. The intermittent control timer section 309 reads out, from the cyclically intermittent operation time period register 310, a predetermined time period in which wireless reception is to be stopped (this time period may be hereinafter referred to as "stop-time data"), and causes the timer to operate for the predetermined time period thus read out. Furthermore, while the timer operates, the intermittent control timer section 309 supplies, to the cyclically intermittent control section 311, a timer operation signal indicating that the timer operates.

The cyclically intermittent control section 311 controls the operation of the wireless signal reception section 301 in accordance with the timer operation signal supplied from the intermittent control timer section 309. Specifically, while the timer operation signal is supplied, the cyclically intermittent control section 311 supplies a reception section-OFF signal to the wireless signal reception section 301 so that the wireless signal reception section 301 stops receiving a wireless signal. On the other hand, while the timer operation signal is not supplied, the cyclically intermittent control section 311 supplies a reception section-ON signal to the wireless signal reception section 301 so that the wireless signal reception section 301 receives a wireless signal.

[Operation of Image Display System]

Next, an explanation is made as to the operation of the image display system 1 in accordance with the present embodiment with reference to FIGS. 2 and 3. FIG. 2 is a timing chart showing operation timing of the wireless signal transmission device 20. FIG. 3 is a timing chart showing operation timing of the 3D image glasses 30.

(Operation of Wireless Signal Transmission Device)

Initially, with reference to FIG. 2, an explanation is made as to the operation of the wireless signal transmission device 20. (a) of FIG. 2 indicates whether the image display device displays a 2D image or a 3D image. (b) of FIG. 2 indicates, when the image display device displays a 2D image, a frame constituting the 2D image, and when the image display device displays a 3D image, switching between a right-eye image and a left-eye image constituting the 3D image. (c) of FIG. 2 indicates a sync signal transmitted from the image display device and optical shutter control data. (d) of FIG. 2 indicates an image type signal transmitted from the image display device. (e) of FIG. 2 indicates cycle data generated by the cycle detection section 202. (f) of FIG. 2 indicates optical shutter control pattern information generated by the optical shutter control pattern analysis section 204. (g) of FIG. 2 indicates timing at which the wireless signal transmission section 206 transmits a wireless signal. (h) of FIG. 2 indicates a sync-signal-stop signal.

As shown in (h) of FIG. 2, the sync-signal-stop signal indicates, when at a high level, that the image displayed by the image display device is not a 3D image. As shown in (h) of FIG. 2, the sync-signal-stop signal is a binary signal whose level changes according to whether the image displayed by the image display device is a 3D image or not.

(Case of 2D Image)

When the image display device displays a 2D image as shown in (a) and (b) of FIG. 2, the reception section 201 receives a sync signal every time frame images included in the 2D image are switched, but does not receive optical shutter control data, as shown in (c) of FIG. 2. The reception section 201 supplies the received sync signal to the cycle detection section 202.

The cycle detection section 202 generates cycle data A' every time the cycle signal is supplied as shown in (e) of FIG. 2, and stores the latest cycle data A' in the cycle data storage section 203.

When the image type signal indicates that the image display device displays a 2D image as shown in (d) of FIG. 2 or when the image type signal is nor received from the image display device, the wireless signal transmission section 206 generates a sync-signal-stop signal at a high level as shown in (h) of FIG. 2.

At timing to transmit a wireless signal as shown in (g) of FIG. 2, the wireless signal transmission section 206 transmits, to the 3D image glasses 30, cycle data A' read out from the cycle data storage section 203 and the generated sync-signal-stop signal.

(Case of 3D Image)

When the image display device displays a 3D image as shown in (a) and (b) of FIG. 2, the reception section 201 receives a sync signal and optical shutter control data every time a right-eye image and a left-eye image constituting the 3D image are switched as shown in (c) of FIG. 2. The reception section 201 supplies the received sync signal to the cycle detection section 202 and the received optical shutter control data to the optical shutter control pattern analysis section 204.

As shown in (e) of FIG. 2, the cycle detection section 202 generates the cycle data A every time the sync signal is supplied, and stores the latest cycle data A in the cycle data storage section 203. Furthermore, as shown in (f) of FIG. 2, the optical shutter control pattern analysis section 204 generates optical shutter control pattern information (pattern B in (f) of FIG. 2) every time when the optical shutter control data is supplied, and stores the latest optical shutter control pattern information in the optical shutter control pattern storage section 205.

At timing to transmit a wireless signal as shown in (g) of FIG. 2, the wireless signal transmission section 206 transmits, to the 3D image glasses, the received sync signal, the cycle data A stored in the cycle data storage section 203, and the optical shutter control pattern information read out from the optical shutter control pattern storage section 205.

(Operation of 3D Image Glasses)

Next, with reference to FIG. 3, an explanation is made as to the operation of the 3D image glasses 30. (a) of FIG. 3 indicates timing at which the wireless signal transmission device 20 transmits a wireless signal. (b) of FIG. 3 indicates a reception section-ON signal and a reception section-OFF signal which are supplied by the cyclically intermittent control section 311 to the wireless signal reception section 301. (c) of FIG. 3 indicates timing at which the wireless signal reception section 301 receives a wireless signal. (d) of FIG. 3 indicates cycle data received by the wireless signal reception section 301. (e) of FIG. 3 indicates an operation state of the intermittent control timer. (f) of FIG. 3 indicates a cycle signal generated by the cycle signal generation section 303. (g) of FIG. 3 indicates an optical shutter control pattern (optical shutter control pattern information) stored in the optical shutter control pattern storage section 304. (h) of FIG. 3 indicates a sync-signal-stop signal received by the wireless signal reception section 301. (i) of FIG. 3 indicates optical shutter control data generated by the optical shutter control data generation section 305. (j) and (k) indicate a right optical shutter control signal and a left optical shutter control signal, respectively, which are generated by the optical shutter control section 307.

(Case of 2D Image)

When the image displayed by the image display device is a 2D image, the wireless signal reception section 301 receives the sync-signal-stop signal shown in (h) of FIG. 3, and stores the received sync-signal-stop signal in the sync-signal-stop signal storage section 312. Furthermore, the wireless signal reception section 301 supplies, to the intermittent control timer section 309, a reception signal indicative of reception of the sync-signal-stop signal ("completion of reception" in FIG. 1).

Upon reception of the reception signal, the intermittent control timer section 309 reads out, from the cyclically intermittent operation time period register 310, stop-time data indicative of a predetermined time period in which wireless reception is to be stopped, and causes the timer to operate for the predetermined time period. Furthermore, while the timer operates, the intermittent control timer section 309 supplies a timer operation signal shown in (e) of FIG. 3 ("timer in operation" in (e) of FIG. 3) to the cyclically intermittent control section 311.

As shown in (b) of FIG. 3, while the timer operation signal is not supplied, the cyclically intermittent control section 311 supplies the reception section-ON signal to the wireless signal reception section 301. While the reception section-ON signal is supplied, the wireless signal reception section 301 receives a wireless signal.

Furthermore, as shown in (b) of FIG. 3, while the timer operation signal is supplied, the cyclically intermittent control section 311 supplies the reception section-OFF signal to the wireless signal reception section 301. While the reception section-OFF signal is supplied, the wireless signal reception section 301 stops receiving a wireless signal.

As described above, the wireless signal reception section 301 repeats two operations of (i) stopping receiving a wireless signal while the timer of the intermittent control timer section 309 operates and (ii) receiving a wireless signal while the timer does not operate.

Furthermore, the wireless signal reception section 301 receives the cycle data A' shown in (d) of FIG. 3, and stores the received cycle data in the cycle data storage section 302. In a case where the sync-signal-stop signal shown in (h) of FIG. 3 is not stored in the sync-signal-stop signal storage section 312, the cycle signal generation section 303 generates the cycle signal shown in (f) of FIG. 3 in accordance with the cycle data stored in the cycle data storage section 302 and the sync signal, and supplies the cycle signal to the optical shutter control data generation section 305 and the optical shutter control timing generation section 306. In a case where the sync-signal-stop signal shown in (h) of FIG. 3 is stored in the sync-signal-stop signal storage section 312, the cycle signal generation section 303 reads out the sync-signal-stop signal and stops generation of the cycle signal as shown in (f) of FIG. 3.

Since the cycle signal is not supplied from the cycle signal generation section 303, the optical shutter control timing generation section 306 does not generate optical shutter control timing. Furthermore, since the cycle signal is not supplied from the cycle signal generation section 303, the optical shutter control data generation section 305 does not generate optical shutter control data.

Consequently, as shown in (c) of FIG. 3, the wireless signal reception section 301 can periodically receive a part of the wireless signal transmitted from the wireless signal transmission device 20 as shown in (a) of FIG. 3. Accordingly, it is possible to reduce power consumption of the wireless signal reception section 301 while the wireless signal reception section 301 does not receive the wireless signal.

Furthermore, since the cycle signal is not supplied from the cycle signal generation section 303, the optical shutter control timing generation section 306 stops generation of optical shutter control timing. Furthermore, the optical shutter control timing generation section 306 outputs, to the optical shutter control section 307, optical shutter control data for instructing the optical shutters 308 to open both of the right and left optical shutters, so that the optical shutters 308 open both of the right and left optical shutters.

(Case of 3D Image)

In a case where the image displayed by the image display device is a 3D image, the wireless signal reception section 301 receives a sync signal (not shown) and supplies the received sync signal to the cycle signal generation section 303. Furthermore, the wireless signal reception section 301 supplies a reception signal indicative of reception of the sync signal ("completion of reception" in FIG. 1) to the intermittent control timer section 309.

Upon reception of the reception signal, the intermittent control timer section 309 reads out, from the cyclically intermittent operation timer period register 310, stop-time data indicative of a predetermined time period in which wireless reception is to be stopped, and causes the timer to operate for the predetermined time period. Furthermore, while the timer operates, the intermittent control timer section 309 supplies a timer operation signal shown in (e) of FIG. 3 ("timer in operation" in (e) of FIG. 3) to the cyclically intermittent control section 311.

As shown in (b) of FIG. 3, when the timer operation signal is not supplied, the cyclically intermittent control section 311 supplies the reception section-ON signal to the wireless signal reception section 301. While the reception section-ON signal is supplied, the wireless signal reception section 301 stops receiving a wireless signal. When the reception section-ON signal stops to be supplied, the wireless signal reception section 301 receives the wireless signal.

As described above, the wireless signal reception section 301 repeats two operations of (i) stopping receiving a wireless signal while the timer of the intermittent control timer section 309 operates and (ii) receiving a wireless signal while the timer does not operate.

Consequently, as shown in (c) of FIG. 3, the wireless signal reception section 301 can periodically receive a part of the wireless signal transmitted from the wireless signal transmission device 20 as shown in (a) of FIG. 3. Accordingly, it is possible to reduce power consumption of the wireless signal reception section 301 while the wireless signal reception section 301 does not receive the wireless signal.

Furthermore, the wireless signal reception section 301 receives cycle data A shown in (d) of FIG. 3, and stores the received cycle data in the cycle data storage section 302. The cycle signal generation section 303 generates the cycle signal shown in (f) of FIG. 3 in accordance with the cycle data stored in the cycle data storage section 302 and the sync signal, and supplies the cycle signal to the optical shutter control data generation section 305 and the optical shutter control timing generation section 306.

The optical shutter control data generation section 305 generates the optical shutter control data shown in (i) of FIG. 3 in accordance with the optical shutter control pattern information shown in (g) of FIG. 3 which is stored in the optical shutter control pattern storage section 304 and the cycle signal, and supplies the optical shutter control data to the optical shutter control section 307. Furthermore, the optical shutter control timing generation section 306 generates optical shutter control timing (not shown) in accordance with the sync-signal-stop signal shown in (h) of FIG. 3 which is stored in the sync-signal-stop signal storage section 312 and the cycle signal, and supplies the optical shutter control timing to the optical shutter control section 307.

The optical shutter control section 307 generates the right optical shutter control signal as shown in (j) of FIG. 3 and the left optical shutter control signal as shown in (k) of FIG. 3 in accordance with the optical shutter control data as shown in (i) of FIG. 3 and the optical shutter control timing. The optical shutter control section 307 supplies the right optical shutter control signal and the left optical shutter control signal thus generated to the optical shutters 308 so as to control the right optical shutter and the left optical shutter.

As described above, in the case where the image displayed by the image display device is a 3D image, the wireless signal transmission device 20 in accordance with the present embodiment transmits a sync signal. Upon reception of the sync signal, the intermittent control timer section 309 of the 3D image glasses 30 reads out the stop-time data stored in the cyclically intermittent operation time period register 310, and starts the timer. While the timer operates, the cyclically intermittent control section 311 makes the wireless signal reception section 301 off, and after the timer has stopped to operate, the cyclically intermittent control section 311 makes the wireless signal reception section 301 on. Thus, the intermittent control timer section 309 and the cyclically intermittent control section 311 control the wireless signal reception section 301 in such a manner that the wireless signal reception section 301 operates intermittently.

Furthermore, the optical shutter control data generation section 305 of the 3D image glasses 30 generates optical shutter control data (i) with reference to the cycle signal generated by the cycle signal generation section 303 with reference to the sync signal and (ii) in accordance with the received optical shutter control pattern information. Furthermore, the optical shutter control timing generation section 306 generates optical shutter control timing with reference to the cycle signal. The optical shutter control section 307 generates an optical shutter control signal from these two signals so as to drive the right optical shutter and the left optical shutter of the optical shutters 308. It should be noted that the cycle signal generation section 303 continues to generate a cycle signal even, when, the wireless signal reception section 301 is in the off-state. Accordingly, even when the wireless signal reception section 301 is in the off-state, the optical shutter control data generation section 305 and the optical shutter control timing generation section 306 can generate optical shutter control data and optical shutter control timing with reference to the cycle signal, so that the optical shutter control section 307 can continue to generate the optical shutter control signal.

Thus, while the image display device displays a right-eye image, only the right optical shutter is opened, and while the image display device displays a left-eye image, only the left optical shutter is opened.

Furthermore, when the image display device displays a 2D image, the wireless signal transmission device 20 in accordance with the present embodiment generates a sync-signal-stop signal in accordance with the image type signal which is received from the image display device and which indicates that the image display device displays a 2D image, and the wireless signal transmission device 20 transmits the sync-signal-stop signal to the 3D image glasses 30. By receiving the sync-signal-stop signal, the 3D image glasses 30 can cause the wireless signal reception section 301 to stop receiving a wireless signal when the image display device does not display a 3D image as well as when receiving a sync signal for a 3D image.

Consequently, it is possible to cause the wireless signal reception section 301 to operate periodically to receive a wireless signal, and cause the wireless signal reception section 301 to stop in other time period, thereby reducing power consumption of the wireless signal reception section 301.

Furthermore, since the 3D image glasses 30 periodically receive a wireless signal, the 3D image glasses 30 can keep comprehending a time period in which a wireless signal is transmitted from the wireless signal transmission device 20 and via which channel the wireless signal is transmitted. Accordingly, when the image displayed by the image display device is changed from a 2D image to a 3D image, the 3D image glasses 30 can promptly receive a wireless signal and start controlling the optical shutters 308.

In the present embodiment, an explanation was made as to a cased where the image displayed by the image display device is changed from a 2D image to a 3D image. The same is applied to a case where the image is changed from a 3D image to a 2D image.

In the present embodiment, an explanation was made as to a case where the wireless signal transmission device 20 is outwardly connected with the image display device. However, the present invention is not limited to this, and the wireless signal transmission device 20 may be included in the image display device. The wireless signal transmission device 20 and the image display device may be connected via wires or wirelessly.

In the present embodiment, an explanation was made as to a case where when the image displayed by the image display device is not a 3D image, the cycle signal generation section 303 of the 3D image glasses 30 stops generating a cycle signal. However, the present invention is not limited to this case. For example, the optical shutter control timing generation section 306 of the 3D image glasses 30 may stop generating optical shutter control timing.

In this case, the optical shutter control timing generation section 306 stops generating optical shutter control timing when a sync-signal-stop signal is stored in the sync-signal-stop signal storage section 312.

Furthermore, in a case where the image display device displays a 2D image, the cycle signal generation section 303 of the 3D image glasses 30 generates a cycle signal in accordance with cycle data stored in the cycle data storage section 302 and a sync signal, and supplies the cycle signal to the optical shutter control data generation section 305 and the optical shutter control timing generation section 306.

At that time, since the sync-signal-stop signal is stored in the sync-signal-stop signal storage section 312, the optical shutter control timing generation section 306 does not generate optical shutter control timing. Furthermore, since the optical shutter control pattern information is not received, the optical shutter control data generation section 305 does not generate optical shutter control data.

Consequently, while receiving the sync-signal-stop signal, the 3D image glasses 30 can reduce power consumption required for the optical shutter control timing generation section 306 to generate optical shutter control timing.

<Embodiment 2>

Figure 5:
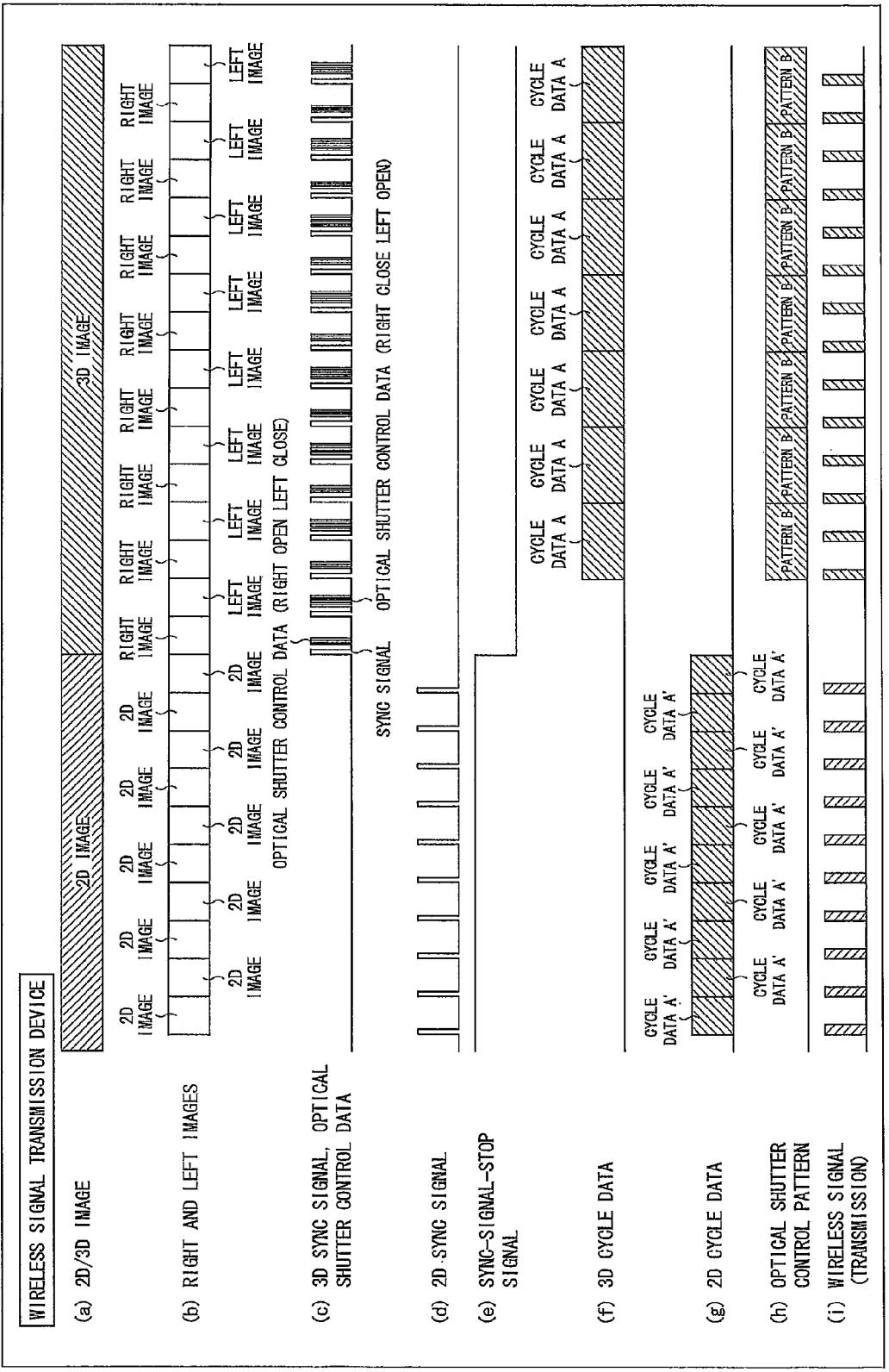
FIG. 5 is a timing chart showing operation timing of a wireless signal transmission device in accordance with another embodiment of the present invention.

The following explains another embodiment of the present invention with reference to FIGS. 4 and 5. For convenience of explanation, members having the same functions as those in Embodiment 1 are given the same reference numerals and explanations thereof are omitted here. In the present embodiment, differences from Embodiment 1 are mainly explained.

[Configuration of Image Display System]

Initially, with reference to FIG. 4, an explanation is made as to an image display system including a wireless signal transmission device in accordance with the present embodiment. FIG. 4 is a block diagram showing a configuration of an image display system 2 in accordance with the present embodiment. As shown in FIG. 4, the image display system 2 in accordance with the present embodiment includes a wireless signal transmission device 21 connected with an image display device (not shown) and 3D image glasses 30.

(Configuration of Wireless Signal Transmission Device)

As shown in FIG. 4, the wireless signal transmission device 21 included in the image display system 2 is the same as the wireless signal transmission device 20 included in the image display system 1 in accordance with Embodiment 1 except that the wireless signal transmission device 21 further includes a 3D cycle detection section (first cycle detection means) 207, a 3D cycle data storage section (first cycle data storage section) 208, a 2D cycle detection section (second cycle detection means) 209, a 2D cycle data storage section 210, and a sync-signal-stop detection section 211.

The reception section 201 receives a 3D sync signal, a 2D sync signal, optical shutter control data etc. from the image display device.

The 3D cycle detection section 207 analyzes the interval of the 3D sync signal received via the reception section 201 to detect the cycle of the 3D sync signal, and stores the detected cycle as 3D cycle data (first cycle data) in the 3D cycle data storage section 208. Furthermore, the 3D cycle detection section 207 updates the cycle data stored in the 3D cycle data storage section 208 every time when the 3D cycle detection section 207 detects the cycle of the 3D sync signal.

The 2D cycle detection section 209 analyzes the interval of the 2D sync signal received via the reception section 201 to detect the cycle of the 2D sync signal, and stores the detected cycle as 2D cycle data (second cycle data) in the 2D cycle data storage section 210. Furthermore, the 2D cycle detection section 209 updates the cycle data stored in the 2D cycle data storage section 210 every time when the 2D cycle detection section 209 detects the cycle of the 2D sync signal.

The sync-signal-stop detection section 211 detects whether the sync signal received from the image display device is a 2D sync signal or a 3D sync signal to detect whether the image displayed by the image display device is a 2D image or a 3D image. When the sync signal is a 2D sync signal, the sync-signal-stop detection section 211 generates a sync-signal-stop signal. When the sync signal is a 3D sync signal, the sync-signal-stop detection section 211 supplies the 3D sync signal to the wireless signal transmission section 206, and when the sync signal is a 2D sync signal, the sync-signal-stop detection section 211 supplies the 2D sync signal and the generated sync-signal-stop signal to the wireless signal transmission section 206.

When the 3D sync signal is supplied from the sync-signal-stop detection section 211, the wireless signal transmission section 206 reads out 3D cycle data from the 3D cycle data storage section 208 and optical shutter control pattern information from the optical shutter control pattern storage section 205. The wireless signal transmission section 206 transmits the 3D sync signal, the 3D cycle data, and the optical shutter control pattern information to the 3D image glasses 30.

When the 2D sync signal and the sync-signal-stop signal are supplied from the sync-signal-stop detection section 211, the wireless signal transmission section 206 reads out 2D cycle data from the 2D cycle data storage section 210. The wireless signal transmission section 206 transmits the 2D sync signal, the 2D cycle data, and the sync-signal-stop signal to the 3D image glasses 30.

(Configuration of 3D Image Glasses)

As shown in FIG. 4, the 3D image glasses 30 included in the image display system 2 are the same as the 3D image glasses 30 included in the image display system 1 in accordance with Embodiment 1.

The wireless signal reception section 301 receives, from the wireless signal transmission device 21, wireless signals such as the optical shutter control pattern information, the 3D cycle data, the 3D sync signal, the 2D cycle data, the 2D sync signal, and the sync-signal-stop signal. The wireless signal reception section 301 stores the received 3D cycle data or 2D cycle data in the cycle data storage section 302, the received optical shutter control pattern in the optical shutter control pattern storage section 304, and the received sync-signal-stop signal in the sync-signal-stop signal storage section 312. Furthermore, the wireless signal reception section 301 supplies the received 3D sync signal or 2D sync signal to the cycle signal generation section 303.

In a case where the sync-signal-stop signal is not stored in the sync-signal-stop signal storage section 312, the cycle signal generation section 303 reads out the 2D cycle data or 3D cycle data stored in the cycle data storage section 302, and generates a cycle signal with reference to the 2D sync signal or 3D sync signal supplied from the wireless signal reception section 301. The cycle signal generation section 303 supplies the generated cycle signal to the optical shutter control data generation section 305 and the optical shutter control timing generation section 306. In a case where the sync-signal-stop signal is received, i.e. in a case where the image display device does not display a 3D image, the cycle signal generation section 303 does not generate a cycle signal.

The optical shutter control data generation section 305 reads out the optical shutter control pattern stored in the optical shutter control pattern storage section 304, and generates optical shutter control data with reference to a cycle signal supplied from the cycle signal generation section 303. The optical shutter control data generation section 305 supplies the generated optical shutter control data to the optical shutter control section 307. In the case where the sync-signal-stop signal is received, i.e. in the case where the image display device does not display a 3D image, the optical shutter control pattern information is not stored in the optical shutter control pattern storage section 304 and the optical shutter control data is not generated.

The optical shutter control timing generation section 306 generates optical shutter control timing with reference to the cycle signal supplied from the cycle signal generation section 303, and supplies the generated optical shutter control timing to the optical shutter control section 307. Furthermore, in a case where the sync-signal-stop signal is stored in the sync-signal-stop signal storage section 312, the cycle signal is not supplied from the cycle signal generation section 303, so that the optical shutter control timing generation section 306 stops generating the optical shutter control timing.

[Operation of Image Display System]

Next, an explanation is made as to the operation of the image display system 2 in accordance with the present embodiment with reference to FIG. 5. FIG. 5 is a timing chart showing operating timing of the wireless signal transmission device 21.

(Operation of Wireless Signal Transmission Device)

Initially, with reference to FIG. 5, an explanation is made as to the operation of the wireless signal transmission device 21. (a) of FIG. 5 indicates whether the image display device displays a 2D image or a 3D image. (b) of FIG. 5 indicates, when the image display device displays a 2D image, a frame constituting the 2D image, and when the image display device displays a 3D image, switching between a right-eye image and a left-eye image constituting the 3D image. (c) of FIG. 5 indicates a 3D sync signal and optical shutter control data which are transmitted from the image display device. (d) of FIG. 5 indicates a 2D sync signal transmitted from the image display device. (e) of FIG. 5 indicates a sync-signal-stop signal generated by the sync-signal-stop detection section 211. (f) of FIG. 5 indicates 3D cycle data generated by the 3D cycle detection section 207 (g) of FIG. 5 indicates 2D cycle data generated by the 2D cycle detection section 209. (h) of FIG. 5 indicates optical shutter control pattern information generated by the optical shutter control pattern analysis section 204. (i) of FIG. 5 indicates timing at which the wireless signal transmission section 206 transmits a wireless signal.

As shown in (e) of FIG. 5, the sync-signal-stop signal indicates, when at a high level, that the image displayed by the image display device is not a 3D image.

(Case of 2D Image)

When the image display device displays a 2D image as shown in (a) and (b) of FIG. 5, the reception section 201 receives a 2D sync signal every time frames included in the 2D image are switched as shown in (d) of FIG. 5. The reception section 201 supplies the received 2D sync signal to the 2D cycle detection section 209 and the sync signal stop detection section 211.

The 2D cycle detection section 209 generates cycle data A' every time the 2D cycle signal is supplied as shown in (g) of FIG. 5, and stores the latest cycle data A' in the 2D cycle data storage section 210.

When the 2D sync signal is supplied, the sync-signal-stop detection section 211 generates a sync-signal-stop signal at a high level as shown in (e) of FIG. 5. The sync-signal-stop detection section 211 supplies the generated sync-signal-stop signal and the 2D sync signal to the wireless signal transmission section 206.

At timing to transmit a wireless signal as shown in (i) of FIG. 5, the wireless signal transmission section 206 transmits, to the 3D image glasses 30, the sync-signal-stop signal and the 2D sync signal which are supplied from the sync signal stop detection section 211 and the cycle data A' read out from the 2D cycle data storage section 210.

(Case of 3D Image)

When the image display device displays a 3D image as shown in (a) and (b) of FIG. 5, the reception section 201 receives a 3D sync signal and optical shutter control data every time a right-eye image and a left-eye image constituting the 3D image are switched as shown in (c) of FIG. 5. The reception section 201 supplies the received 3D sync signal to the 3D cycle detection section 207 and the sync signal-stop-detection section 211 and the received optical shutter control data to the optical shutter control pattern analysis section 204.

As shown in (f) of FIG. 5, the 3D cycle detection section 207 generates the cycle data A every time the 3D sync signal is supplied, and stores the latest cycle data A in the 3D cycle data storage section 208. Furthermore, as shown in (h) of FIG. 5, the optical shutter control pattern analysis section 204 generates optical shutter control pattern information (pattern B in (h) of FIG. 5) every time when the optical shutter control data is supplied, and stores the latest optical shutter control pattern information in the optical shutter control pattern storage section 205.

At timing to transmit a wireless signal as shown in (i) of FIG. 5, the wireless signal transmission section 206 transmits, to the 3D image glasses 30, the 3D sync signal supplied from the sync-signal-stop detection section 211, the cycle data A read out from the 3D cycle data storage section 208, and the optical shutter control pattern information read out from the optical shutter control pattern storage section 205.

(Operation of 3D Image Glasses)

The operation of the 3D image glasses 30 included in the image display system 2 in accordance with the present embodiment is the same as the operation of the 3D image glasses 30 included in the image display system 1 in accordance with Embodiment 1.

As described above, in the case where the image displayed by the image display device is a 3D image, the wireless signal transmission device 21 in accordance with the present embodiment transmits a 3D sync signal to the 3D image glasses 30. Upon reception of the sync signal, the intermittent control timer section 309 of the 3D image glasses 30 reads out the stop-time data stored in the cyclically intermittent operation time period register 310, and starts the timer. While the timer operates, the cyclically intermittent control section 311 makes the wireless signal reception section 301 off, and after the timer has stopped to operate, the cyclically intermittent control section 311 makes the wireless signal reception section 301 on. Thus, the intermittent control timer section 309 and the cyclically intermittent control section 311 control the wireless signal reception section 301 in such a manner that the wireless signal reception section 301 operates intermittently.

Furthermore, the optical shutter control data generation section 305 of the 3D image glasses 30 generates optical shutter control data (i) with reference to the cycle signal generated by the cycle signal generation section 303 with reference to the 3D sync signal and (ii) in accordance with the received optical shutter control pattern information. Furthermore, the optical shutter control timing generation section 306 generates optical shutter control timing with reference to the cycle signal. The optical shutter control section 307 generates an optical shutter control signal from these two signals so as to drive the right optical shutter and the left optical shutter of the optical shutters 308. It should be noted that the cycle signal generation section 303 continues to generate a cycle signal even when the wireless signal reception section 301 is in the off-state. Accordingly, even when the wireless signal reception section 301 is in the off-state, the optical shutter control data generation section 305 and the optical shutter control timing generation section 306 can generate optical shutter control data and optical shutter control timing with reference to the cycle signal, so that the optical shutter control section 307 can continue to generate the optical shutter control signal.

Thus, while the image display device displays a right-eye image, only the right optical shutter is opened, and while the image display device displays a left-eye image, only the left optical shutter is opened.

Furthermore, when the image display device displays a 2D image, the wireless signal transmission device 21 in accordance with the present embodiment generates a sync-signal-stop signal from the 2D sync signal received from the image display device, and the wireless signal transmission device 21 transmits the sync-signal-stop signal to the 3D image glasses 30. By receiving the sync-signal-stop signal, the 3D image glasses 30 can cause the wireless signal reception section 301 to stop receiving a wireless signal when the image display device does not display a 3D image as well as when receiving a sync signal for a 3D image.

Consequently, it is possible to cause the wireless signal reception section 301 to operate periodically to receive a wireless signal, and cause the wireless signal reception section 301 to stop in other time period, thereby reducing power consumption of the wireless signal reception section 301.

Furthermore, since the 3D image glasses 30 periodically receive a wireless signal, the 3D image glasses can keep comprehending a time period in which a wireless signal is transmitted from the wireless signal transmission device 21 and via which channel the wireless signal is transmitted. Accordingly, when the image displayed by the image display device is changed from a 2D image to a 3D image, the 3D image glasses 30 can promptly receive a wireless signal and start controlling the optical shutters 308.

<Embodiment 3>

Figure 7:
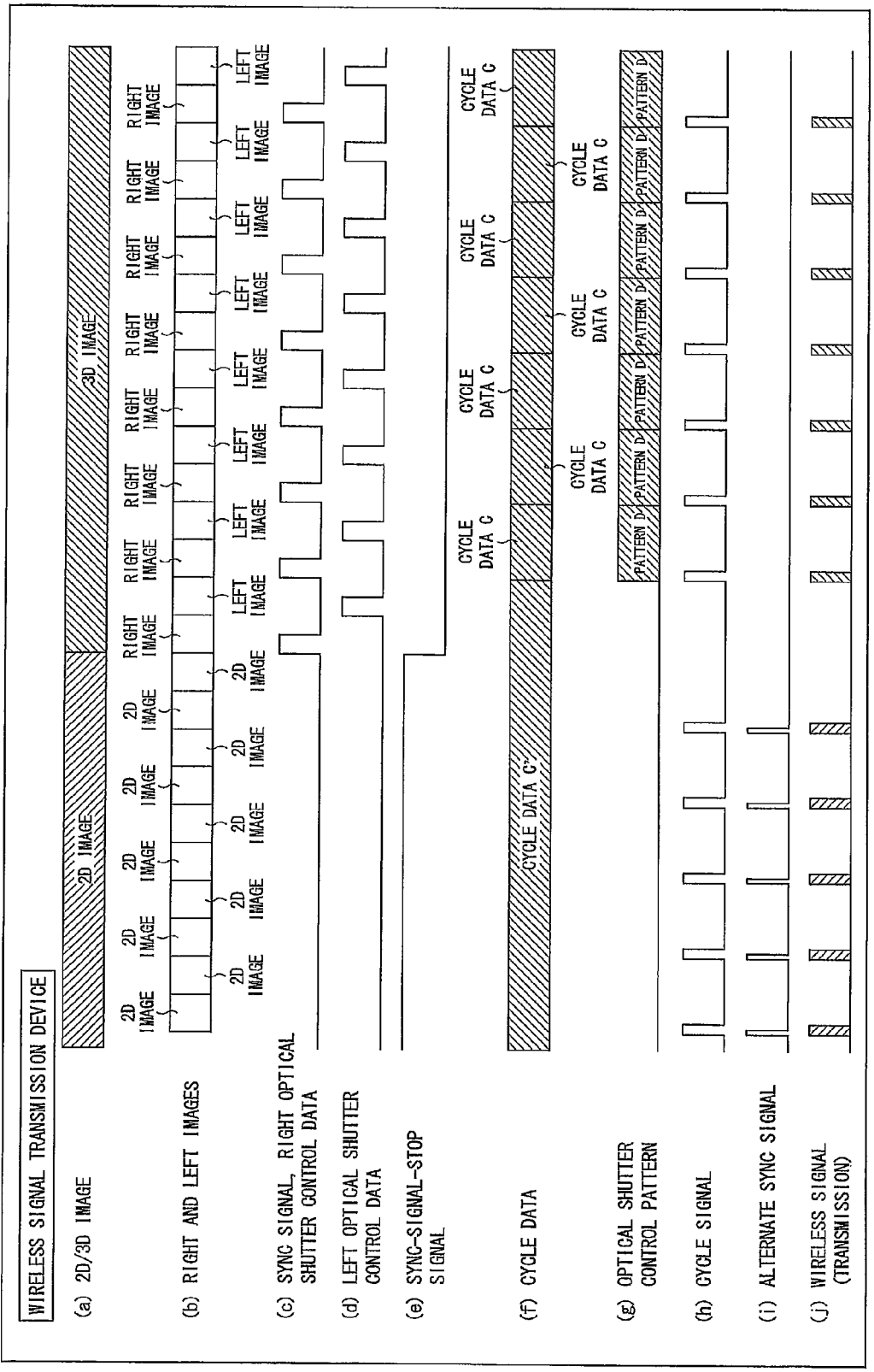
FIG. 7 is a timing chart showing operation timing of a wireless signal transmission device in accordance with still another embodiment of the present invention.
Figure 8:
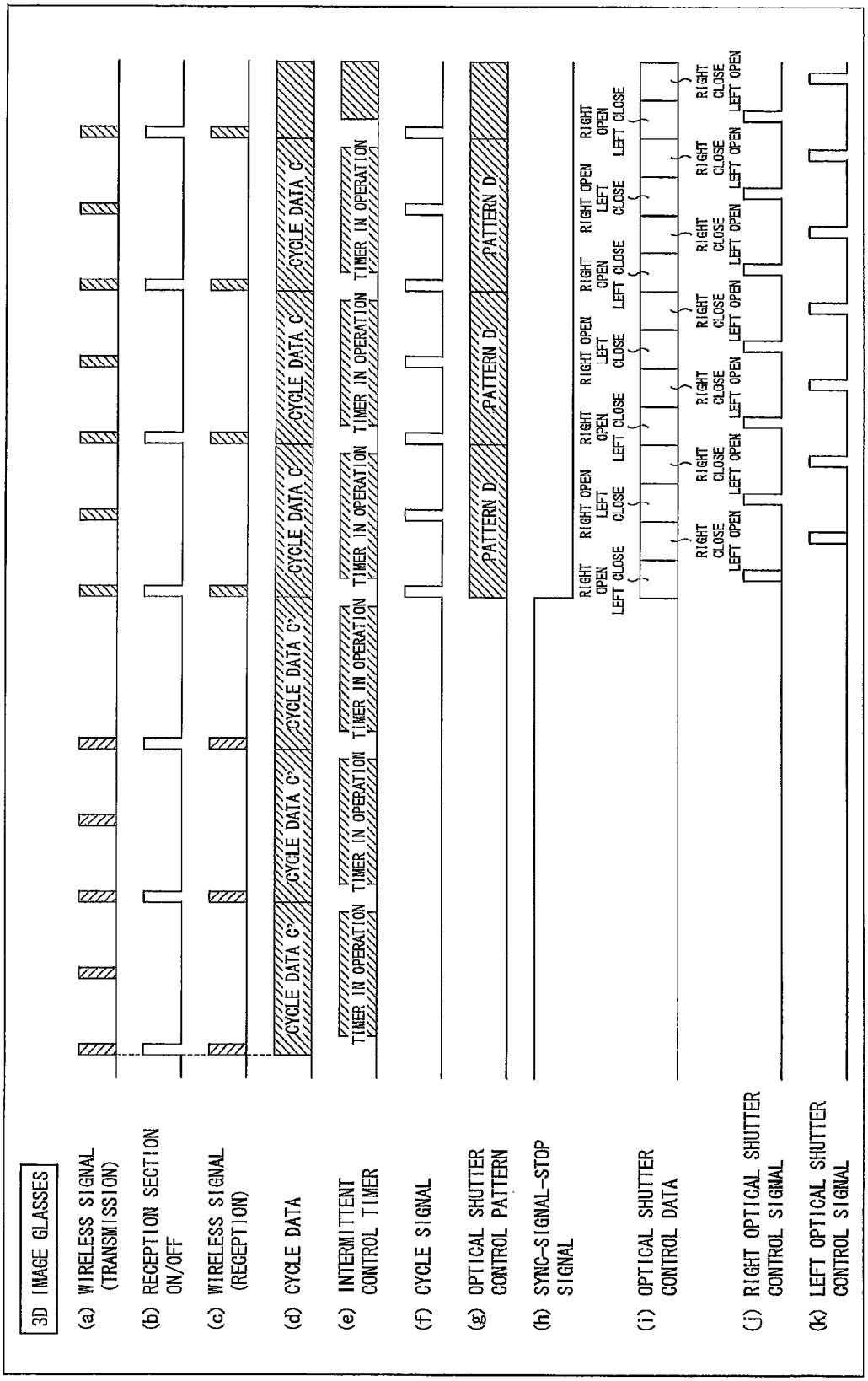
FIG. 8 is a timing chart showing operation timing of 3D image glasses in accordance with still another embodiment of the present invention.
Figure 9:
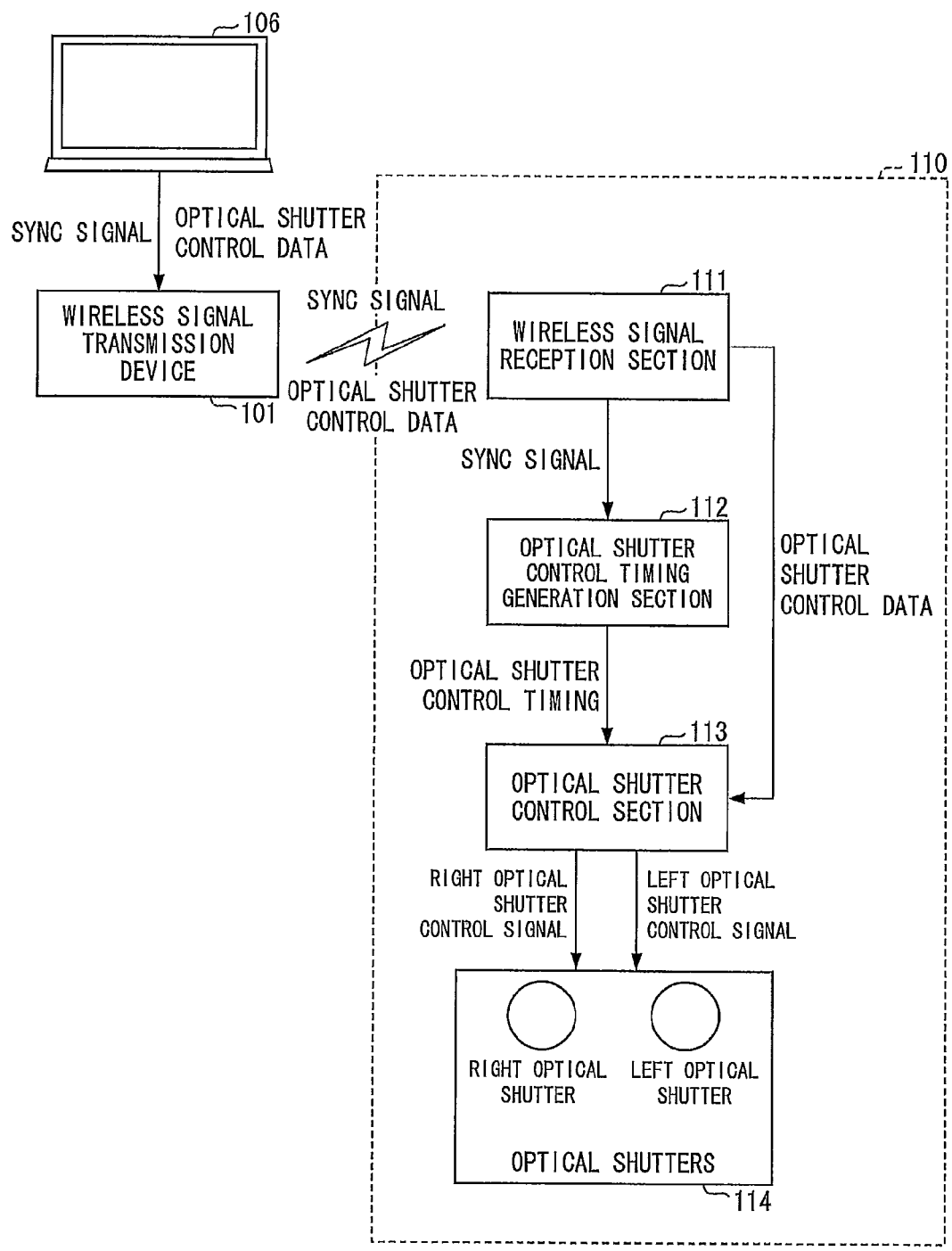
FIG. 9 is a block diagram showing configurations of a conventional wireless signal transmission device and conventional 3D image glasses.
Figure 10:
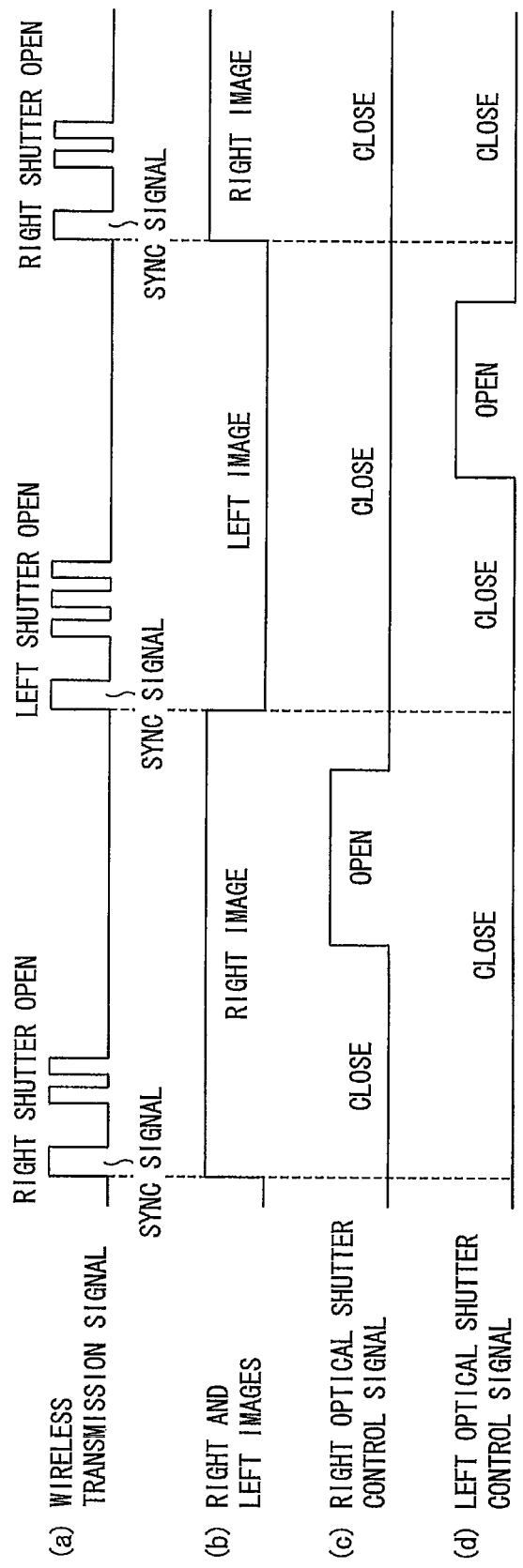
FIG. 10 is a timing chart showing timing of control operation of the conventional wireless signal transmission device shown in FIG. 9.

The following explains still another embodiment of the present invention with reference to FIGS. 6 to 8. For convenience of explanation, members having the same functions as those in Embodiment 1 are given the same reference numerals and explanations thereof are omitted here. In the present embodiment, differences from Embodiment 1 are mainly explained.

[Configuration of Image Display System]

Initially, with reference to FIG. 6, an explanation is made as to an image display system including a wireless signal transmission device in accordance with the present embodiment. FIG. 6 is a block diagram showing a configuration of an image display system 3 in accordance with the present embodiment. As shown in FIG. 6, the image display system 3 in accordance with the present embodiment includes a wireless signal transmission device 22 connected with an image display device (not shown) and 3D image glasses 30.

In the present embodiment, an explanation is made as to a case where when the image display device displays a 3D image, the 3D image glasses 30 receive a sync signal (3D sync signal), and when the image display device does not display a 3D image, the 3D image glasses 30 do not receive the sync signal.

Examples of the case where the image display device does not display a 3D image include a case where the image display device displays a 2D image and a case where the image display device displays no image. Examples of the case where the image display device displays no image include a case where supply of a 2D image or a 3D image to the image display device (i.e. TV broadcasting in case where the image display device is a TV receiver) has been finished and a case where no power is supplied to the image display device.

(Configuration of Wireless Signal Transmission Device)

As shown in FIG. 6, the wireless signal transmission device 22 included in the image display system 3 is the same as the wireless signal transmission device 20 included in the image display system 1 in accordance with Embodiment 1 except that the wireless signal transmission device 22 further includes a sync-signal-stop detection section 211, a cycle signal generation section (cycle signal generation means) 212, and an alternate sync signal generation section (alternate sync signal generation means) 213.

In the cycle data storage section 203, there are stored not only the cycle data stored by the cycle detection section 202 but also default cycle data indicative of a predetermined cycle (data indicative of a predetermined cycle).

The sync-signal-stop detection section 211 detects whether a sync signal is received from the image display device or not, and when the sync signal is not received (i.e. the image display device does not display a 3D image), the sync-signal-stop detection section 211 generates a sync-signal-stop signal. When the sync signal is received, the sync-signal-stop detection section 211 supplies the sync signal to the wireless signal transmission section 206, and when the sync signal is not received, the sync-signal-stop detection section 211 supplies the generated sync-signal-stop signal to the wireless signal transmission section 206.

The cycle signal generation section 212 generates a cycle signal having the same cycle as the cycle data read out from the cycle data storage section 203. In a case where a cycle signal has not been received, no cycle data is stored in the cycle data storage section 203. In this case, the cycle signal generation section 212 reads out the default cycle data, and generates a cycle signal in accordance with the default cycle data.

In a case where a sync-signal-stop signal is generated by the sync-signal-stop detection section 211, i.e. in a case where a 3D sync signal is not received from the image display device, the alternate sync signal generation section 213 generates an alternate sync signal with reference to the cycle signal generated by the cycle signal generation section 212.

When the 3D sync signal is supplied from the sync-signal-stop detection section 211, the wireless signal transmission section 206 reads out cycle data from the cycle data storage section 203 and optical shutter control pattern information from the optical shutter control pattern storage section 205. The wireless signal transmission section 206 transmits the 3D sync signal, the cycle data, and the optical shutter control pattern information to the 3D image glasses 30.

When the sync-signal-stop signal is supplied from the sync-signal-stop detection section 211, the wireless signal transmission section 206 reads out cycle data from the cycle data storage section 203, and obtains the alternate sync signal generated by the alternate sync signal generation section 213. The wireless signal transmission section 206 transmits the cycle data, the sync-signal-stop signal, and the alternate sync signal to the 3D image glasses 30.

(Configuration of 3D Image Glasses)

As shown in FIG. 6, the 3D image glasses 30 included in the image display system 3 are the same as the 3D image glasses 30 included in the image display system 1 in accordance with Embodiment 1.

The wireless signal reception section 301 receives, from the wireless signal transmission device 22, wireless signals such as the optical shutter control pattern information, the cycle data, the sync signal, the alternate sync signal, and the sync-signal-stop signal. The wireless signal reception section 301 stores the received cycle data in the cycle data storage section 302, the received optical shutter control pattern in the optical shutter control pattern storage section 304, and the received sync-signal-stop signal in the sync-signal-stop signal storage section 312. Furthermore, the wireless signal reception section 301 supplies the received sync signal or the received alternate sync signal to the cycle signal generation section 303.

In a case where the sync-signal-stop signal is not stored in the sync-signal-stop signal storage section 312, the cycle signal generation section 303 reads out the cycle data stored in the cycle data storage section 302, and generates a cycle signal with reference to the sync signal or the alternate sync signal supplied from the wireless signal reception section 301. The cycle signal generation section 303 supplies the generated cycle signal to the optical shutter control data generation section 305 and the optical shutter control timing generation section 306. In a case where the sync-signal-stop signal is received, i.e. in a case where the image display device does not display a 3D image, the cycle signal generation section 303 does not generate a cycle signal.

[Operation of Image Display System]

Next, an explanation is made as to the operation of the image display system 3 in accordance with the present embodiment with reference to FIGS. 7 and 8. FIG. 7 is a timing chart showing operating timing of the wireless signal transmission device 22 in accordance with the present embodiment. FIG. 8 is a timing chart showing operation timings of the 3D image glasses 30 in accordance with the present embodiment.

(Operation of Wireless Signal Transmission Device)

Initially, with reference to FIG. 7, an explanation is made as to the operation of the wireless signal transmission device 22. (a) of FIG. 7 indicates whether the image display device displays a 2D image or a 3D image. (b) of FIG. 7 indicates, when the image display device displays a 2D image, a frame constituting the 2D image, and when the image display device displays a 3D image, switching between a right-eye image and a left-eye image constituting the 3D image. (c) of FIG. 7 indicates a sync signal and right-eye optical shutter control data which are transmitted from the image display device. (d) of FIG. 7 indicates left-eye optical shutter control data. (e) of FIG. 7 indicates a sync-signal-stop signal generated by the sync-signal-stop detection section 211. (f) of FIG. 7 indicates cycle data generated by the cycle detection section 202. (g) of FIG. 7 indicates optical shutter control pattern information generated by the optical shutter control pattern analysis section 204. (h) of FIG. 7 indicates a cycle signal generated by the cycle signal generation section 212. (i) of FIG. 7 indicates an alternate sync signal generated by the alternate sync signal generation section 213. (j) of FIG. 7 indicates timing at which the wireless signal transmission section 206 transmits a wireless signal.

As shown in (e) of FIG. 7, the sync-signal-stop signal indicates, when at a high level, that the image displayed by the image display device is not a 3D image.

As shown in (c) of FIG. 7, in the present embodiment, a case where the right-eye optical shutter control data doubles as the sync signal is shown as an example in the drawing. Alternatively, the left-eye optical shutter control data may double as the sync signal.

(Case of 2D Image)

When the image display device displays a 2D image as shown in (a) and (b) of FIG. 7, the sync signal is not received as shown in (c) of FIG. 7.

When the sync signal is not supplied, the sync-signal-stop detection section 211 generates a sync-signal-stop signal at a high level as shown in (e) of FIG. 7. The sync-signal-stop detection section 211 supplies the generated sync-signal-stop signal to the wireless signal transmission section 206 and the alternate sync signal generation section 213.

When the sync-signal-stop signal is supplied, the alternate sync signal generation section 213 generates the alternate sync signal shown in (i) of FIG. 7 from a cycle signal generated by, the cycle signal generation section 212 based on cycle data C' shown in (f) of FIG. 7 which is stored in the cycle data storage section 203. The alternate sync signal generation section 213 supplies the generated alternate sync signal to the wireless signal transmission section 206.

At timing to transmit a wireless signal as shown in (j) of FIG. 7, the wireless signal transmission section 206 transmits, to the 3D image glasses 30, the sync-signal-stop signal supplied from the sync-signal-stop detection section 211, the alternate sync signal, and the cycle data C' read out from the cycle data storage section 203.

(Case of 3D Image)

When the image display device displays a 3D image as shown in (a) and (b) of FIG. 7, the reception section 201 receives a sync signal and optical shutter control data every time a right-eye image and a left-eye image constituting the 3D image are switched as shown in (c) and (d) of FIG. 7. The reception section 201 supplies the received sync signal to the cycle detection section 202 and the sync-signal-stop detection section 211 and the received optical shutter control data to the optical shutter control pattern analysis section 204.

As shown in (f) of FIG. 7, the cycle detection section 202 generates the cycle data C every time the sync signal is supplied, and stores the latest cycle data C in the cycle data storage section 203. Furthermore, as shown in (g) of FIG. 7, the optical shutter control pattern analysis section 204 generates optical shutter control pattern information (pattern D in (g) of FIG. 7) every time when the optical shutter control data is supplied, and stores the latest optical shutter control pattern information in the optical shutter control pattern storage section 205.

At timing to transmit a wireless signal as shown in (j) of FIG. 7, the wireless signal transmission section 206 transmits, to the 3D image glasses 30, the sync signal supplied from the sync-signal-stop detection section 211, the cycle data C read out from the cycle data storage section 203, and the optical shutter control pattern information read out from the optical shutter control pattern storage section 205.

(Operation of 3D Image Glasses)

Next, with reference to FIG. 8, an explanation is made as to the operation of the 3D image glasses 30. (a) of FIG. 8 indicates timing at which the wireless signal transmission device 22 transmits a wireless signal. (b) of FIG. 8 indicates a reception section-ON signal and a reception section-OFF signal which are supplied by the cyclically intermittent control section 311 to the wireless signal reception section 301. (c) of FIG. 8 indicates timing at which the wireless signal reception section 301 receives a wireless signal. (d) of FIG. 8 indicates cycle data received by the wireless signal reception section 301. (e) of FIG. 8 indicates an operation state of the intermittent control timer. (f) of FIG. 8 indicates a cycle signal generated by the cycle signal generation section 303. (g) of FIG. 8 indicates an optical shutter control pattern (optical shutter control pattern signal) stored in the optical shutter control pattern storage section 304. (h) of FIG. 8 indicates a sync-signal-stop signal received by the wireless signal reception section 301. (i) of FIG. 8 indicates optical shutter control data generated by the optical shutter control data generation section 305. (j) and (k) indicate a right optical shutter control signal and a left optical shutter control signal, respectively, which are generated by the optical shutter control section 307.

The operation of the 3D image glasses 30 included in the image display system 3 in accordance with the present embodiment is the same as the operation of the 3D image glasses 30 included in the image display system 1 in accordance with Embodiment 1 shown in FIG. 3 except that the received cycle data is cycle data C' and cycle data C as shown in (d) and (e) of FIG. 8 and the optical shutter control pattern stored in the optical shutter control pattern storage section 304 is pattern D.

As described above, in the case where the image displayed by the image display device is a 3D image, the wireless signal transmission device 22 in accordance with the present embodiment transmits a sync signal to the 3D image glasses 30. Upon reception of the sync signal, the intermittent control timer section 309 of the 3D image glasses 30 reads out the stop-time data stored in the cyclically intermittent operation time period register 310, and starts the timer. While the timer operates, the cyclically intermittent control section 311 makes the wireless signal reception section 301 off, and after the timer has stopped to operate, the cyclically intermittent control section 311 makes the wireless signal reception section 301 on. Thus, the intermittent control timer section 309 and the cyclically intermittent control section 311 control the wireless signal reception section 301 in such a manner that the wireless signal reception section 301 operates intermittently.

Furthermore, the optical shutter control data generation section 305 of the 3D image glasses 30 generates optical shutter control data (i) with reference to the cycle signal generated by the cycle signal generation section 303 with reference to the sync signal and (ii) in accordance with the received optical shutter control pattern information. Furthermore, the optical shutter control timing generation section 306 generates optical shutter control timing with reference to the cycle signal. The optical shutter control section 307 generates an optical shutter control signal from these two signals so as to drive the right optical shutter and the left optical shutter of the optical shutters 308. It should be noted that the cycle signal generation section 303 continues to generate a cycle signal even when the wireless signal reception section 301 is in the off-state. Accordingly, even when the wireless signal reception section 301 is in the off-state, the optical shutter control data generation section 305 and the optical shutter control timing generation section 306 can generate optical shutter control data and optical shutter control timing with reference to the cycle signal, so that the optical shutter control section 307 can continue to generate the optical shutter control signal.

Thus, while the image display device displays a right-eye image, only the right optical shutter is opened, and while the image display device displays a left-eye image, only the left optical shutter is opened.

Furthermore, when the image display device displays a 2D image, the wireless signal transmission device 22 in accordance with the present embodiment generates a sync-signal-stop signal and an alternate sync signal, and transmits the sync-signal-stop signal and the alternate sync signal to the 3D image glasses 30. By receiving the sync-signal-stop signal and the alternate sync signal, the 3D image glasses 30 can cause the wireless signal reception section 301 to stop receiving a wireless signal when the image display device does not display a 3D image as well as when receiving a sync signal for a 3D image.

Consequently, it is possible to cause the wireless signal reception section 301 to operate periodically to receive a wireless signal, and cause the wireless signal reception section 301 to stop in other time period, thereby reducing power consumption of the wireless signal reception section 301.

Furthermore, since the 3D image glasses 30 periodically receive a wireless signal, the 3D image glasses can keep comprehending a time period in which a wireless signal is transmitted from the wireless signal transmission device 22 and via which channel the wireless signal is transmitted. Accordingly, when the image displayed by the image display device is changed from a 2D image to a 3D image, the 3D image glasses 30 can promptly receive a wireless signal and start controlling the optical shutters 308.

[Additional Note 1]

As described above, the wireless signal transmission device of the present invention includes a wireless signal transmission section for, when an image display device displays a 3D image which is a three-dimensional image including a right-eye image and a left-eye image, transmitting, to 3D image glasses, (i) a first sync signal indicative of timing at which the right-eye image and the left-eye image included in the 3D image are switched and (ii) an optical shutter control signal for controlling optical shutters of the 3D image glasses which optical shutters alternately transmit and shut the right-eye image and the left-eye image, when the image display device displays an image other than a 3D image, the wireless signal transmission section periodically transmitting a certain signal which does not include the optical shutter control signal.

With the arrangement, when the image displayed by the image display device is a 3D image, the wireless signal transmission section of the wireless signal transmission device transmits the first sync signal and the optical shutter control signal, and when the image is not a 3D image (i.e. when the image is a 2D image which is a two-dimensional image or no image is displayed), the wireless signal transmission section periodically transmits the certain signal which does not include at least the optical shutter control signal. Consequently, even when the image displayed by the image display device is not a 3D image, the wireless signal transmission device can periodically transmit the certain signal to the 3D image glasses.

Examples of the case where the image display device displays no image include a case where supply of a 2D image or a 3D image to the image display device (e.g. TV broadcasting in case where the image display device is a TV receiver) has been finished and a case where no power is supplied to the image display device.

With the wireless signal transmission device, the 3D image glasses receive the certain signal, thereby periodically receiving a signal even when the image display device does not display a 3D image. Consequently, the 3D image glasses can reduce power consumption by periodically receiving a signal, even when the image display device does not display a 3D image. Accordingly, the wireless signal transmission device can reduce power consumption of the 3D image glasses even when the image display device does not display a 3D image.

Furthermore, since the 3D image glasses periodically receive (intermittently receive) a wireless signal, the 3D image glasses can keep comprehending a time period in which a wireless signal is transmitted from the wireless signal transmission device and via which channel the wireless signal is transmitted. Accordingly, when the image displayed by the image display device is changed from a 2D image to a 3D image, the 3D image glasses can promptly receive a wireless signal and start to operate.

A 2D image and a 3D image may be a moving image, a still image, or a combination of a moving image and a still image.

It is preferable to arrange the wireless signal transmission device of the present invention such that the certain signal is a sync-signal-stop signal which is a binary signal whose level changes according to whether the image display device displays a 3D image or an image other than a 3D image.

With the arrangement, the wireless signal transmission section transmits a sync-signal-stop signal which is a binary signal whose level changes according to whether the first sync signal is received (i.e. the image display device displays a 3D image) or the first sync signal is not received (i.e. the image display device displays a 2D image). Accordingly, the wireless signal transmission section can generate the sync-signal-stop signal by the most simple signal generation of changing the level of a signal when the image displayed by the image display device is changed.

For example, the wireless signal transmission section generates a sync-signal-stop signal at a high level when the image display device displays a 2D image, and a sync-signal-stop signal at a low level when the image display device displays a 3D image.

It is preferable to arrange the wireless signal transmission device of the present invention to further include a reception section for receiving an image type signal indicative of whether the image display device displays a 3D image or a 2D image which is a two-dimensional image, when the reception section does not receive the image type signal indicating that the image display device displays a 3D image, the wireless signal transmission section periodically transmitting a certain signal which does not include at least the optical shutter control signal.

With the arrangement, the reception section of the wireless signal transmission device receives the image type signal indicative of whether the image display device displays a 2D image or a 3D image. Accordingly, the wireless signal transmission device can more surely recognize whether the image display device displays a 2D image or a 3D image.

When the reception section does not receive the image type signal indicating that the image display device displays a 3D image, i.e. when the image display device does not display a 3D image, the wireless signal transmission section can transmit the certain signal to the 3D image glasses. When the reception section does not receive the image type signal indicating that the image display device displays a 3D image is, for example, when the image type signal indicates that the image display device displays a 2D image.

It is preferable to arrange the wireless signal transmission device of the present invention so as to further include a reception section for receiving a second sync signal indicative of timing at which frame images included in a 2D image are switched when the image display device displays a 2D image which is a two-dimensional image, when the reception section receives the second sync signal, the wireless signal transmission section transmitting the certain signal and the second sync signal.

With the arrangement, when the image display device displays a 3D image, the wireless signal transmission section transmits the first sync signal, and when the image display device displays a 2D image, the wireless signal transmission section transmits the certain signal and the second sync signal.

It is preferable to arrange the wireless signal transmission device of the present invention so as to further include: a reception section for receiving the first sync signal and receiving, when the image display device displays a 2D image which is a two-dimensional image, a second sync signal indicative of timing at which frame images included in a 2D image are switched; first cycle detection means for detecting a cycle of the first sync signal and generating first cycle data; and second cycle detection means for detecting a cycle of the second sync signal and generating second cycle data, when the reception section receives the first sync signal, the wireless signal transmission section transmitting the first sync signal and the first cycle data, and when the reception section receives the second sync signal, the wireless signal transmission section transmitting the certain signal, the second sync signal, and the second cycle data.

With the arrangement, when the image display device displays a 3D image, the wireless signal transmission section transmits the first sync signal and the first cycle data. When the image display device displays a 2D image, the wireless signal transmission section transmits the certain signal, the second sync signal, and the second cycle data.

Accordingly, in accordance with the second sync signal and the second cycle data, the 3D image glasses can easily generate a signal required for reducing power consumption by periodically receiving the signal. Therefore, the wireless signal transmission device can reduce a process relating to generation of a signal in the 3D image glasses, thereby further reducing power consumption.

It is preferable to arrange the wireless signal transmission device of the present invention so as to further include: first cycle detection means for detecting a cycle of the first sync signal and generating first cycle data; cycle signal generation means for generating a cycle signal from the first cycle data; and alternate sync signal generation means for generating an alternate sync signal with reference to the cycle signal, when the image display device displays an image other than a 3D image, the wireless signal transmission section transmitting the certain signal and the alternate sync signal.

With the arrangement, when the image display device displays a 3D image, the wireless signal transmission section transmits the first sync signal, and when the image display device does not display a 3D image, the wireless signal transmission section transmits the certain signal and the alternate sync signal. By transmitting the alternate sync signal, the wireless signal transmission device can transmit a sync signal even when the image display device does not display a 3D image.

Accordingly, it is possible to convert an infrared signal (IR signal), which is transmitted from an image display device that transmits a sync signal in an infrared form only when the image display device displays a 3D image, to a wireless signal (RF signal) and transmit the wireless signal. That is, by connecting the image display device with the wireless signal transmission device via wires or wirelessly, it is possible to transmit a sync signal even when a sync signal for a 3D image is not received (i.e. even when the image display device displays a 2D image or no image), without modifying the image display device.

Furthermore, by designing the alternate sync signal at the time when the image displayed by the image display device is changed from a 3D image to other state (e.g. 2D image) to have the same cycle and timing as the sync signal for a 3D image, it is possible to synchronize timing at which the 3D image glasses receive a wireless signal intermittently with timing at which the wireless signal transmission device transmits a wireless signal. Accordingly, the 3D image glasses may maintain the timing at which the 3D image glasses receive a wireless signal intermittently.

It is preferable to arrange the wireless signal transmission device of the present invention so as to further include: first cycle detection means for detecting a cycle of the first sync signal and generating first cycle data; cycle signal generation means for generating a cycle signal from the first cycle data; and a first cycle data storage section in which the first cycle data generated by the first cycle detection means is stored, in the first cycle data storage section, not only the first cycle data but also data indicative of a predetermined cycle are stored, the cycle signal generation section reading out the first cycle data stored in the first cycle data storage section to generate a cycle signal, and when the first cycle data is not stored in the first cycle data storage section, the cycle signal generation section reading out the data indicative of a predetermined cycle to generate a cycle signal.

With the arrangement, when the first cycle data is stored in the first cycle data storage section, the cycle signal generation means generates the cycle signal from the first cycle data, and when the first cycle data is not stored in the first cycle data storage section, the cycle signal generation means generates the cycle signal from the data indicative of a predetermined cycle. Accordingly, even when the first cycle data is not stored, i.e. even when the first sync signal is not received, the cycle signal generation means can generate a cycle signal.

It is preferable to arrange the wireless signal transmission device of the present invention such that the reception section receives optical shutter control data for controlling the optical shutters of the 3D image glasses, the wireless signal transmission device further comprising optical shutter control pattern analysis means for analyzing repeated ones of the optical shutter control data to generate optical shutter control pattern information in which the repeated ones of the optical shutter control data are patterned.

It is preferable to arrange the wireless signal transmission device of the present invention so as to further include: a reception section for receiving optical shutter control data for controlling the optical shutters of the 3D image glasses; and optical shutter control pattern analysis means for analyzing repeated ones of the optical shutter control data to generate optical shutter control pattern information in which the repeated ones of the optical shutter control data are patterned.

With the arrangement, the optical shutter control pattern analysis means receives the optical shutter control data from the image display device and analyzes repeated patterns of the optical shutter control data. Consequently, in the wireless signal transmission device, the optical shutter control pattern analysis means can always generate the latest optical shutter control pattern information.

It is preferable to arrange the wireless signal transmission device of the present invention such that the optical shutter control signal transmitted by the wireless signal transmission section together with the first sync signal is the optical shutter control pattern information.

With the arrangement, the wireless signal transmission section transmits the first sync signal, the first cycle data, and the optical shutter control pattern information to the 3D image glasses. Since the 3D image glasses can receive the optical shutter control pattern information, it is unnecessary for the 3D image glasses to analyze optical shutter control pattern. Consequently, the 3D image glasses can reduce the function relating to analysis of the optical shutter control pattern, thereby reducing costs. Further, the 3D image glasses can reduce power consumption required for the analysis of the optical shutter control pattern.

As described above, the 3D image glasses of the present invention include a wireless signal reception section for, when an image display device displays a 3D image which is a three-dimensional image including a right-eye image and a left-eye image, receiving (i) a first sync signal indicative of timing at which the right-eye image and the left-eye image included in the 3D image are switched and (ii) an optical shutter control signal for controlling optical shutters which alternately transmit and shut the right-eye image and the left-eye image, when the image display device displays an image other than a 3D image, the wireless signal reception section receiving a certain signal which does not include the optical shutter control signal, the 3D image glasses further comprising reception intermittent control means for, when the wireless signal reception section receives the first sync signal or the certain signal, controlling the wireless signal reception section to stop receiving a wireless signal for a predetermined time period.

With the arrangement, when the image displayed by the image display device is a 3D image, the wireless signal reception section receives the first sync signal and the optical shutter control signal, and when the image is not a 3D image when the image is a 2D image or no image is displayed), the wireless signal reception section receives the certain signal. Furthermore, even when the first sync signal or the certain signal is received, the reception intermittent control means causes the wireless signal reception section to stop receiving a wireless signal for a predetermined time period.

Examples of the case where the image display device displays no image include a case where supply of a 2D image or a 3D image to the image display device (i.e. TV broadcasting in case where the image display device is a TV receiver) has been finished and a case where no power is supplied to the image display device.

Consequently, the reception intermittent control means enables the 3D image glasses to be free from a problem that when the first sync signal and the optical shutter control signal are received, the operation of the wireless signal reception can be stopped for a predetermined time, whereas when the image display device does not display a 3D image, no signal is received and the operation of the wireless signal reception section cannot be stopped for the predetermined time. That is, the reception intermittent control means periodically receives the certain signal even when the image display device does not display a 3D image, thereby stopping the operation of the wireless signal reception section for the predetermined time period.

Even when the image displayed by the image display device is not a 3D image, the operation of the wireless signal reception section can be stopped intermittently for the predetermined time period. This allows reducing power consumption of the wireless signal reception section.

It is preferable to arrange the 3D image glasses of the present invention such that the certain signal is a sync-signal-stop signal which is a binary signal whose level changes according to whether the image display device displays a 3D image or an image other than a 3D image.

With the arrangement, the 3D image glasses receive a sync-signal-stop signal which is a binary signal whose level changes according to whether the first sync signal is received (i.e. the image display device displays a 3D image) or the first sync signal is not received (i.e. the image display device displays a 2D image). Accordingly, the 3D image glasses receive a simplest signal whose level changes when the image displayed by the image display device changes, and operate in accordance with the received signal.

Furthermore, since the 3D image glasses periodically receive (intermittently receive) a wireless signal, the 3D image glasses can keep comprehending a time period in which a wireless signal is transmitted from the wireless signal transmission device and via which channel the wireless signal is transmitted. Accordingly, when the image displayed by the image display device is changed from a 2D image to a 3D image, the 3D image glasses can promptly receive a wireless signal and start to operate.

It is preferable to arrange the 3D image glasses of the present invention such that the optical shutter control signal received by the wireless signal reception section includes (i) first cycle data indicative of a cycle of the first sync signal and (ii) optical shutter control pattern information in which data for controlling the optical shutters which alternately transmit and shut the right-eye image and the left-eye image is patterned, the 3D image glasses further including: cycle signal generation means for generating a cycle signal with reference to the first sync signal and in accordance with the first cycle data; optical shutter control data generation means for generating optical shutter control data from the optical shutter control pattern information with reference to the cycle signal; optical shutter control timing generation means for generating, with reference to the cycle signal, optical shutter control timing at which opening and closing of the optical shutters are controlled; and optical shutter control means for generating an optical shutter control signal for controlling opening and closing of the optical shutters in accordance with the optical shutter control data and the optical shutter control timing.

With the arrangement, the optical shutter control data generation means and the optical shutter control timing generation means generate the optical shutter control data and the optical shutter control timing with reference to the cycle signal. Furthermore, the optical shutter control means generates the optical shutter control signal in accordance with the optical shutter control data and the optical shutter control timing.

Accordingly, the 3D image glasses can generate the optical shutter control signal in accordance with information transmitted from the wireless signal transmission device, so that the 3D image glasses can control optical shutters without receiving a signal from the wireless signal transmission device for a predetermined time period.

It is preferable to arrange the 3D image glasses of the present invention so as to further include: a register in which stop-time data indicative of a predetermined time period in which the reception intermittent control means causes the wireless signal reception section to stop receiving a wireless signal is stored; and timer control means for reading out the stop-time data stored in the register and causing the timer to operate for the predetermined time period, the reception intermittent control means causing the wireless signal reception section to stop receiving a wireless signal while the timer operates.

With the arrangement, the reception intermittent control means causes the wireless signal reception section to stop receiving a wireless signal for a predetermined time period. Consequently, the 3D image glasses can reduce power consumption required for the wireless signal reception section to receive a wireless signal.

It is preferable to arrange the 3D image glasses of the present invention such that the certain signal is a sync-signal-stop signal which is a binary signal whose level changes according to whether the image display device displays a 3D image or an image other than a 3D image, and when the wireless signal reception section receives the sync-signal-stop signal, the cycle signal generation section stops generating the cycle signal.

With the arrangement, when the sync-signal-stop signal is received, the 3D image glasses cause the cycle signal generation means to stop generating the cycle signal. Consequently, the 3D image glasses can open both of the right and left optical shutters while the sync-signal-stop signal is received, and a user can view a 2D image by both eyes.

Furthermore, since the 3D image glasses cause the cycle signal generation means to stop generating the cycle signal when the sync-signal-stop signal is received, the 3D image glasses can reduce power consumption required for the cycle signal generation means to generate the cycle signal while the sync-signal-stop signal is received.

The image display system of the present invention includes an image display device, the aforementioned wireless signal transmission device, and the aforementioned 3D image glasses.

Furthermore, the present invention encompasses (i) a program which operates the wireless signal transmission device of the present invention or the 3D image glasses of the present invention and which causes a computer to function as the aforementioned sections of the wireless signal transmission device or the 3D image glasses and (ii) a computer-readable storage medium in which the program is stored.

[Additional Note 2]

The wireless signal transmission device of the present invention and the 3D image glasses of the present invention may be arranged as follows.

(Configuration 1)

A wireless signal transmission device which receives, from an image display device, a sync signal for switching a right-eye image and a left-eye image displayed by the image display device and an optical shutter control signal for displaying the right-eye image and the left-eye image and which transmits the sync signal and the optical shutter control signal to 3D image glasses, the wireless signal transmission device including: a cycle detection section for analyzing an interval of the sync signal to detect a cycle of the sync signal; and a cycle data storage section in which the detected cycle is stored as cycle data, the cycle data stored in the cycle data storage section being updated every time the cycle detection section detects the cycle of the sync signal, the wireless signal transmission device further including a wireless signal transmission section for periodically transmitting sync-signal-stop information when the sync signal for switching the right-eye image and the left-eye image is stopped.

(Configuration 2)

The wireless signal transmission device as set forth in Configuration 1, wherein the wireless signal transmission device receives the sync signal for switching the right-eye image and the left-eye image when the image display device displays a 3D image and the wireless signal transmission device receives a sync signal in sync with timing at which frames constituting a 2D image are switched when the image display device displays a 2D image, and the wireless signal transmission device receives an image type signal indicative of whether the image display device displays a 2D image or a 3D image, and when the wireless signal transmission device receives an image type signal indicating that the image display device displays a 2D image, the wireless signal transmission section transmitting the sync signal in sync with timing at which frames constituting a 2D image are switched and the sync-signal-stop information.

(Configuration 3)

The wireless signal transmission device as set forth in Configuration 1, wherein when the image display device displays a 2D image, the wireless signal transmission device receives a 2D sync signal in sync with the 2D image, the wireless signal transmission device further includes a sync-signal-stop detection section for detecting that the sync signal indicating that the image display device displays a 3D image is stopped and generating a sync-signal-stop signal, a cycle detection section 2 for analyzing an interval of the received 2D sync signal to detect a cycle of the 2D sync signal, and a cycle data storage section 2 in which the detected cycle is stored as 2D cycle data, the 2D cycle data stored in the cycle data storage section 2 is updated every time the cycle detection section 2 detects the cycle of the sync signal, and upon reception of the sync-signal-stop signal from the sync-signal-stop detection section, the wireless signal transmission section transmits the 2D sync signal as a sync signal, the 2D cycle data as cycle data, and the cycle-signal-stop information.

(Configuration 4)

The wireless signal transmission device as set forth in Configuration 1, further including: a cycle signal generation section for repeatedly generating a cycle signal in accordance with the cycle data stored in the cycle data storage section; a sync-signal-stop detection section for detecting that the sync signal is stopped and generating a sync-signal-stop signal; and an alternate sync signal generation section for, upon reception of the sync-signal-stop signal from the sync-signal-stop detection section, generating an alternate sync signal with reference to the cycle signal generated by the cycle signal generation section, the wireless signal transmission section transmitting the alternate sync signal as a sync signal and the sync-signal-stop information.

(Configuration 5)

The wireless signal transmission device as set forth in Configuration 4 wherein suitable value is stored as a default value in the cycle data storage section, and when the cycle detection section does not detect the cycle of the sync signal, a cycle signal is repeatedly generated in accordance with the default value.

(Configuration 6)

The wireless signal transmission device as set forth in any one of Configurations 1 to 5, further including: an optical shutter control pattern analysis section for analyzing repeated ones of optical shutter control data to obtain a pattern of the optical shutter control data; and an optical shutter control pattern storage section in which optical shutter control pattern information generated by patterning the optical shutter control data is stored.

(Configuration 7)

The wireless signal transmission device as set forth in Configuration 6, wherein the wireless signal transmission section reads out the cycle data from the cycle data storage section and the optical shutter control pattern information from the optical shutter control pattern storage section and transmits the cycle data and the optical shutter control pattern information as well as the sync signal to the 3D image glasses.

(Configuration 8)

3D image glasses, including: a wireless signal reception section for wirelessly receiving a sync signal, cycle data, and a sync-signal-stop signal from the wireless signal transmission device with the above configuration; a cycle signal generation section for repeatedly generating a cycle signal with reference to the received sync signal and in accordance with the received cycle data; a cycle intermittent control section for making control such that wireless reception is stopped for a predetermined time period; and a sync-signal-stop information storage section in which the received sync-signal-stop signal is stored, generation of the sync signal being continued while the wireless reception is stopped.

(Configuration 9)

The 3D image glasses as set forth in Configuration 8, wherein the wireless signal reception section further wirelessly receives optical shutter control pattern information from the wireless signal transmission device with the above configuration, the 3D image glasses further including: an optical shutter control data generation section for generating optical shutter control data with reference to the cycle signal generated by the cycle signal generation section and in accordance with the received optical shutter control pattern information; an optical shutter control signal timing generation section for generating control signal timing for opening and closing of optical shutters; and an optical shutter control section for generating an optical shutter control signal for controlling opening and closing of right and left optical shutters of the optical shutters in accordance with outputs from the optical shutter control data generation section and the optical shutter control signal timing generation section.

(Configuration 10)

The 3D image glasses as set forth in Configuration 8 or 9, further comprising an intermittent control timer section and a cyclically intermittent operation time period register section each for controlling reception by the wireless signal reception section, a time period stored in the cycle intermittent operation time period register section being transmitted to the intermittent control timer section, and the cycle intermittent control section stopping while an intermittent control timer of the intermittent control timer section operates.

(Configuration 11)

The 3D image glasses as set forth in any one of Configurations 8 to 10, wherein when sync-signal-stop information is read out from the sync-signal-stop information storage section and the sync-signal-stop signal is stored therein, generation of the cycle signal is stopped.

(Configuration 12)

An image display system, including: an image display device; the wireless signal transmission device as set forth in any one of Configurations 1 to 7; and the 3D image glasses as set forth in any one of Configurations 8 to 11.

In first aspect of the present invention, the wireless signal transmission device receives, from the image display device, a sync signal in sync with a 3D image and a 2D image and an image type signal indicative of whether the image display device displays a 3D image or a 2D image, and when the image type signal indicates that the image display device displays a 2D image, the wireless signal transmission device transmits the sync signal and sync-signal-stop information indicating that the image display device does not display a 3D image.

In second aspect of the present invention, the wireless signal transmission device receives, from the image display device, a sync signal in sync with a 3D image when the image display device displays a 3D image and a 2D sync signal in sync with a 2D image when the image display device displays a 2D image, and when it is detected that the sync signal is stopped, the wireless signal transmission device transmits the 2D sync signal as a sync signal and sync-signal-stop information indicating that the sync signal is stopped.

In third aspect of the present invention, when it is detected that a sync timing signal is stopped, the wireless signal transmission device generates therein a dummy sync signal having the same cycle as a default cycle set appropriately in advance or a cycle of a sync timing signal having been recently transmitted to the wireless signal transmission device, and the wireless signal transmission device transmits the dummy sync signal as a sync signal and sync-signal-stop information indicating that the sync signal is stopped.

[Program and Storage Medium]

Each block of the wireless signal transmission device 20 and the 3D image glasses 30 may be realized by hardware by using a logic circuit on an integrated circuit (IC chip) or may be realized by software by using CPUs (Central Processing Unit).

In the latter case, the wireless signal transmission device 20 and the 3D image glasses 30 include: the CPUs for executing a program for realizing functions of each block; the ROMs (read only memory) that store the program; the RAMs (random access memory) that develop the program; the storage devices (storage mediums) that store the program and various data; and the like. The object of the present invention can be realized in such a manner that the wireless signal transmission device 20 and the 3D image glasses 30 are provided with a computer-readable storage medium for storing program codes (such as executable program, intermediate code program, and source program) of control programs of the wireless signal transmission device 20 and the 3D image glasses 30 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, semiconductor memories such as mask ROM, EPROM, EEPROM, and flash ROM, or logic circuits such as PLD (Programmable Logic Device) and FPGA (Field Programmable Gate Array).

Further, the wireless signal transmission device 20 and the 3D image glasses 30 may be arranged so as to be connectable to a communication network so that the program code is supplied to the wireless signal transmission device 20 and the 3D image glasses 30 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR (High Data Rate), NFC (Near Field Communication), DLNA (Digital Living Network Alliance), mobile phone network, satellite connections, and terrestrial digital network.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to a wireless signal transmission device outwardly connected with or included in an image display device such as a television receiver and a personal computer, and 3D image glasses enabling a viewer to view a 3D image.

REFERENCE SIGNS LIST

1, 2, 3. Image display system
20, 21, 22. Wireless signal transmission device
201. Reception section
202. Cycle detection section (first cycle detection means, second cycle detection means)
203. Cycle data storage section (first cycle data storage section)
204. Optical shutter control pattern analysis section (optical shutter control pattern analysis means)
205. Optical shutter control pattern storage section
206. Wireless signal transmission section
207. 3D cycle detection section (first cycle detection means)
208. 3D cycle data storage section (first cycle data storage section)

209. 2D cycle detection section (second cycle detection means)
210. 2D cycle data storage section
211. Cycle-signal-stop detection section
212. Cycle signal generation section (cycle signal generation means)
213. Alternate sync signal generation section (alternate sync signal generation means)
30. 3D image glasses
301. Wireless signal reception section
302. Cycle data storage section
303. Cycle signal generation section (cycle signal generation means)
304. Optical shutter control pattern storage section
305. Optical shutter control data generation section (optical shutter control data generation means)
306. Optical shutter control timing generation section (optical shutter control timing generation means)
307. Optical shutter control section (optical shutter control means)
308. Optical shutters
309. Intermittent control timer section (timer control means)
310. Cyclically intermittent operation timer period register (register)
311. Cyclically intermittent control section (reception intermittent control means)

The invention claimed is:

1. A wireless signal transmission device, comprising a wireless signal transmission section for, when an image display device displays a 3D image which is a three-dimensional image including a right-eye image and a left-eye image, transmitting, to 3D image glasses, (i) a first sync signal indicative of timing at which the right-eye image and the left-eye image included in the 3D image are switched and (ii) an optical shutter control signal for controlling optical shutters of the 3D image glasses which optical shutters alternately transmit and shut the right-eye image and the left-eye image,
when the image display device displays an image other than a 3D image, the wireless signal transmission section periodically transmitting a certain signal which does not include the optical shutter control signal.

2. The wireless signal transmission device as set forth in claim 1, wherein the certain signal is a sync-signal-stop signal which is a binary signal whose level changes according to whether the image display device displays a 3D image or an image other than a 3D image.

3. The wireless signal transmission device as set forth in claim 1, further comprising a reception section for receiving an image type signal indicative of whether the image display device displays a 3D image or a 2D image which is a two-dimensional image,
when the reception section does not receive the image type signal indicating that the image display device displays a 3D image, the wireless signal transmission section periodically transmitting a certain signal which does not include at least the optical shutter control signal.

4. The wireless signal transmission device as set forth in claim 3, wherein
the reception section receives optical shutter control data for controlling the optical shutters of the 3D image glasses,
the wireless signal transmission device further comprising an optical shutter control pattern analysis section for analyzing repeated ones of the optical shutter control data to generate optical shutter control pattern information in which the repeated ones of the optical shutter control data are patterned.

5. The wireless signal transmission device as set forth in claim 4, wherein the optical shutter control signal transmitted by the wireless signal transmission section together with the first sync signal is the optical shutter control pattern information.

6. The wireless signal transmission device as set forth in claim 1, further comprising a reception section for receiving a second sync signal indicative of timing at which frame images included in a 2D image are switched when the image display device displays a 2D image which is a two-dimensional image,
when the reception section receives the second sync signal, the wireless signal transmission section transmitting the certain signal and the second sync signal.

7. The wireless signal transmission device as set forth in claim 1, further comprising:
a reception section for receiving the first sync signal and receiving, when the image display device displays a 2D image which is a two-dimensional image, a second sync signal indicative of timing at which frame images included in a 2D image are switched;
a first cycle detection section for detecting a cycle of the first sync signal and generating first cycle data; and
a second cycle detection section for detecting a cycle of the second sync signal and generating second cycle data,
when the reception section receives the first sync signal, the wireless signal transmission section transmitting the first sync signal and the first cycle data, and
when the reception section receives the second sync signal, the wireless signal transmission section transmitting the certain signal, the second sync signal, and the second cycle data.

8. The wireless signal transmission device as set forth in claim 1, further comprising:
a first cycle detection section for detecting a cycle of the first sync signal and generating first cycle data;
a cycle signal generation section for generating a cycle signal from the first cycle data; and
an alternate sync signal generation section for generating an alternate sync signal with reference to the cycle signal,
when the image display device displays an image other than a 3D image, the wireless signal transmission section transmitting the certain signal and the alternate sync signal.

9. The wireless signal transmission device as set forth in claim 8, further comprising:
a reception section for receiving optical shutter control data for controlling the optical shutters of the 3D image glasses; and
an optical shutter control pattern analysis section for analyzing repeated ones of the optical shutter control data to generate optical shutter control pattern information in which the repeated ones of the optical shutter control data are patterned.

10. The wireless signal transmission device as set forth in claim 1, further comprising:
a first cycle detection section for detecting a cycle of the first sync signal and generating first cycle data;
a cycle signal generation section for generating a cycle signal from the first cycle data; and
a first cycle data storage section in which the first cycle data generated by the first cycle detection section is stored,
in the first cycle data storage section, not only the first cycle data but also data indicative of a predetermined cycle are stored, the cycle signal generation section reading out the first cycle data stored in the first cycle data storage section to generate a cycle signal, and when the first cycle data is not stored in the first cycle data storage section, the cycle signal generation section reading out the data indicative of a predetermined cycle to generate a cycle signal.

11. 3D image glasses, comprising a wireless signal reception section for, when an image display device displays a 3D image which is a three-dimensional image including a right-eye image and a left-eye image, receiving (i) a first sync signal indicative of timing at which the right-eye image and the left-eye image included in the 3D image are switched and (ii) an optical shutter control signal for controlling optical shutters which alternately transmit and shut the right-eye image and the left-eye image, when the image display device displays an image other than a 3D image, the wireless signal reception section receiving a certain signal which does not include the optical shutter control signal, the 3D image glasses further comprising a reception inten intermittent control section for, when the wireless signal reception section receives the first sync signal or the certain signal, controlling the wireless signal reception section to stop receiving a wireless signal for a predetermined time period.

12. The 3D image glasses as set forth in claim 11, wherein the certain signal is a sync-signal-stop signal which is a binary signal whose level changes according to whether the image display device displays a 3D image or an image other than a 3D image.

13. The 3D image glasses as set forth in claim 11, wherein the optical shutter control signal received by the wireless signal reception section includes (i) first cycle data indicative of a cycle of the first sync signal and (ii) optical shutter control pattern information in which data for controlling the optical shutters which alternately transmit and shut the right-eye image and the left-eye image is patterned, the 3D image glasses further comprising:
a cycle signal generation section for generating a cycle signal with reference to the first sync signal and in accordance with the first cycle data;
an optical shutter control data generation section for generating optical shutter control data from the optical shutter control pattern information with reference to the cycle signal;
an optical shutter control timing generation section for generating, with reference to the cycle signal, optical shutter control timing at which opening and closing of the optical shutters are controlled; and
an optical shutter control section for generating an optical shutter control signal for controlling opening and closing of the optical shutters in accordance with the optical shutter control data and the optical shutter control timing.

14. The 3D image glasses as set forth in claim 13, wherein the certain signal is a sync-signal-stop signal which is a binary signal whose level changes according to whether the image display device displays a 3D image or an image other than a 3D image, and when the wireless signal reception section receives the sync-signal-stop signal, the cycle signal generation section stops generating the cycle signal.

15. The 3D image glasses as set forth in claim 11, further comprising:
a register in which stop-time data indicative of a predetermined time period in which the reception intermittent control section causes the wireless signal reception section to stop receiving a wireless signal is stored; and
a timer control section for reading out the stop-time data stored in the register and causing the timer to operate for the predetermined time period,
the reception intermittent control section causing the wireless signal reception section to stop receiving a wireless signal while the timer operates.

* * * * *